(12) United States Patent
Akagawa

(10) Patent No.: US 7,023,124 B2
(45) Date of Patent: Apr. 4, 2006

(54) MICRO-ACTUATOR ARRAY, MICRO-ACTUATOR DEVICE, OPTICAL SWITCH, ARRAY, AND OPTICAL SWITCH SYSTEM

(75) Inventor: Keiichi Akagawa, Kamakura (JP)

(73) Assignee: Nikon Corporation, Tokyo (JP)

( * ) Notice: Subject to any disclaimer, the term of this patent is extended or adjusted under 35 U.S.C. 154(b) by 169 days.

(21) Appl. No.: 10/724,075

(22) Filed: Dec. 1, 2003

(65) Prior Publication Data

US 2004/0207287 A1 Oct. 21, 2004

(30) Foreign Application Priority Data

Dec. 2, 2002 (JP) ............................. 2002-349313

(51) Int. Cl.
*H02K 1/00* (2006.01)

(52) U.S. Cl. ........................................ 310/309; 385/18

(58) Field of Classification Search ................ 310/309; 359/290, 291, 224; 385/16–18
See application file for complete search history.

(56) References Cited

U.S. PATENT DOCUMENTS

| 4,001,635 | A | * | 1/1977 | D'Auria et al. ............. 347/233 |
| 5,322,258 | A | * | 6/1994 | Bosch et al. .................. 251/65 |
| 6,618,518 | B1 | | 9/2003 | Mahadevan et al. .......... 385/18 |
| 2004/0207287 | A1 | * | 10/2004 | Akagawa .................... 310/309 |

FOREIGN PATENT DOCUMENTS

| JP | A 5-113543 | 5/1993 |
| JP | A 2001-42233 | 2/2001 |

* cited by examiner

*Primary Examiner*—Karl Tamai
(74) *Attorney, Agent, or Firm*—Oliff & Berridge PLC

(57) ABSTRACT

A microactuator array includes a plurality of first terminals equal in number to a first number, a plurality of second terminals equal in number to a second number, and a plurality of microactuators equal in number to the product of the first number and the second number. Each microactuator comprises a fixed electrode and a movable electrode which is movable with respect to the fixed electrode by electrostatic force. Each first terminal is electrically connected to fixed electrodes of microactuators equal in number to the second number. Each second terminal is electrically connected to movable electrodes of microactuators equal in number to the first number. The first terminals are not connected to any of the second terminals.

13 Claims, 24 Drawing Sheets

MICRO-ACTUATOR ARRAY, MICRO-ACTUATOR DEVICE, OPTICAL SWITCH, ARRAY, AND OPTICAL SWITCH SYSTEM

INCORPORATION BY REFERENCE

The disclosures of the following priority application are herein incorporated by reference:

Japanese Patent Application No. 2002-349313 filed Dec. 2, 2002

BACKGROUND OF THE INVENTION

1. Field of the Invention

The present invention relates to a micro-actuator array, and a micro-actuator device, an optical switch array, and an optical switch system, which use the micro-actuator array. Such an optical switch array may be used in, for example, optical communication.

2. Description of the Related Art

Development in micromachining technology has increased the importance of actuators in various fields. A microactuator may be used in, for example, the field of an optical switch used in, for example, optical communication and used for switching optical paths. An example of such an optical switch is disclosed in, for example, Japanese Unexamined Patent Application Publication No. 2001-42233.

A microactuator for moving a micromirror is used in the optical switch disclosed in Japanese Unexamined Patent Application Publication No. 2001-42233. The microactuator comprises a movable section which is movable with respect to a fixed section. The movable section can be restored to an upper position (where the micromirror reflects incident light) by its springiness. A first electrode (fixed electrode) is disposed at the fixed section, and a second electrode (movable electrode) is disposed at the movable section. By applying a voltage between the first and second electrodes to generate an electrostatic force therebetween, the movable section is moved to a lower position (where the micromirror transmits incident light as it is) and held there. When the application of the voltage between the first and second electrodes is stopped, the movable section is restored to the upper position by its springiness.

Another example of an optical switch is a matrix optical switch disclosed in Japanese Unexamined Patent Application Publication No. 5-113543. In the optical switch, very small mirrors are driven by a plurality of microactuators disposed in a matrix on the same substrate. The driving principle of each microactuator is, for example, electromagnetic induction. In addition, in the optical switch, for example, a selective circuit and address circuits (X address decoder and Y address decoder) for supplying a drive signal to each microactuator by decoding a command signal are disposed on the substrate.

Optical switches are available in various sizes, from small sizes of 2×2 channels and 4×4 channels to large sizes of 128×128 channels and 256×256 channels. Japanese Unexamined Patent Application Publication No. 2001-42233 only discloses a one-channel optical switch. As in Japanese Unexamined Patent Application Publication No. 5-113543, the size of this optical switch can be increased by disposing a plurality of the microactuators disclosed in Japanese Unexamined Patent Application Publication No. 2001-42233 on the same substrate.

When an optical switch is formed by disposing a plurality of microactuators using electrostatic force, the wiring method differs depending upon the size of the optical switch.

Although not disclosed in Japanese Unexamined Patent Application Publication No. 2001-42233 or Japanese Unexamined Patent Application Publication No. 5-113543, in a small optical switch, conventionally, either one of the fixed electrodes and the movable electrodes of the respective microactuators are electrically connected in common on a substrate and are defined as common electrodes, whereas the other of the fixed electrodes and movable electrodes of the respective microactuators are used as individual electrodes without being electrically connected to each other. These electrodes are connected outside the substrate. Therefore, for example, for an N×N channel optical switch, $N^2+1$ wires are connected outside the substrate. The phrase "electrodes are connected outside the substrate" refers to electrically connecting an external connection wiring to the electrodes. For convenience of explanation, the aforementioned method will be called a "common electrode/individual electrode external connection method."

In contrast, in a large optical switch, conventionally, as disclosed in Japanese Unexamined Patent Application Publication No. 5-113543, for example, an address circuit and a selective circuit are formed using, for example, CMOS on a substrate on which the microactuators are mounted, and about ten wires are connected outside the substrate. For convenience of explanation, such a method will be called an address circuit mounting method.

The address circuit mounting method is very advantageous from the viewpoint that a small number of wires are connected outside the substrate even if the optical switch is large. However, the address circuit mounting method has the following first to third disadvantages. Therefore, if the optical switch is not at least a certain size, the disadvantages far outweigh the advantages. As a result, the address circuit mounting method is not suitable for optical switches of intermediate and smaller sizes.

The first disadvantage of the address circuit mounting method is that highly pressure-resistant MOS is required for forming, for example, an address circuit and a selective circuit because a voltage of about tens of volts, or in some cases a high voltage equal to or greater than 100 volts, is often required for electrostatically driving an actuator. Since a device formed of a highly pressure-resistant MOS has a larger planar size than that formed of an ordinary MOS, the size of the actuator is also increased. The second disadvantage is that costs are increased because the number of steps of a production process is increased by a MOS production step. The third disadvantage is that costs are increased due to the addition of a smoothening step, which is carried out because, if smoothening is not sufficiently carried out after producing MOS, the shape of a base is transferred to the shape of MEMS (Micro Electro Mechanical System) to be formed on top of MOS, causing malfunctioning.

In contrast to this, the common electrode/individual electrode external connection method does not have the disadvantages of the address circuit mounting method because an address circuit, a selective circuit, etc., are not mounted. However, even if the optical switch is of an intermediate or smaller size, the optical switch becomes only slightly larger, with the number of wires to be externally connected being considerably increased. Therefore, the optical switch can be formed with a size of the order of 8×8 channels at most. Even if the optical switch is an 8×8 channel optical switch, it is necessary to externally connect as many as 65 wires.

SUMMARY OF THE INVENTION

The present invention provides a microactuator array which makes it possible to reduce the number of wires which are externally connected, and a microactuator device, an optical switch array, and an optical switch system, which use the microactuator array.

A first microactuator array of the present invention comprises:

a plurality of first terminals equal in number to a first number;

a plurality of second terminals equal in number to a second number; and a plurality of microactuators equal in number to the product of the first number and the second number, wherein each microactuator comprises a fixed electrode and a movable electrode which is movable with respect to the fixed electrode by electrostatic force, wherein each first terminal is electrically connected to fixed electrodes of microactuators equal in number to the second number, wherein each second terminal is electrically connected to movable electrodes of microactuators equal in number to the first number, and wherein the first terminals are not connect to any of the second terminals.

In the microactuator array, it is desirable that the microactuators equal in number to the product of the first number and the second number be disposed in a lattice in a two-dimensional plane; one end of each microactuator be fixed at the fixed electrode, and the other end of each microactuator be moved with respect to the fixed electrode and have a beam section where the movable electrode is disposed; and each beam section be two-dimensionally bent and a portion of each beam section be two-dimensionally superimposed on the beam section of an adjacent microactuator.

It is desirable that mirrors for switching optical paths be provided, each mirror being disposed at a movable section including the corresponding movable electrode of the corresponding microactuator.

A first microactuator device of the present invention comprises the microactuator array, and a controller for selectively applying a voltage to the first terminals equal in number to the first number and the second terminals equal in number to the second number.

In the microactuator device, it is desirable that, when the movable electrode of a first microactuator is driven so as to be attracted to the fixed electrode, the controller applies a voltage to a second terminal connected to the movable electrode of the first microactuator and to a first terminal connected to the fixed electrode of the first microactuator so that a potential difference between the movable electrode and the fixed electrode of the first microactuator is equal to or greater than a predetermined potential difference.

It is desirable that the microactuator device further comprise:

a magnetic field generating section for generating a magnetic field around the microactuator array, wherein each microactuator has an electrical current path, disposed at a movable section including the corresponding movable electrode, for generating Lorentz force in the magnetic field, and wherein, when the movable electrode of a microactuator is driven so as to be attracted to the fixed electrode, the controller applies a predetermined voltage to the second terminal connected to the movable electrode of the microactuator and to the first terminal connected to the fixed electrode of the microactuator, and passes a predetermined electrical current through an electrical current path of the microactuator.

A second microactuator array of the present invention comprises a plurality of microactuators; a first terminal group comprising a plurality of terminals; and a second terminal group comprising a plurality of terminals, wherein (a) each microactuator comprises a movable section disposed so as to be movable with respect to a fixed section, a first electrode disposed at the fixed section, and a second electrode disposed at the movable section and capable of generating electrostatic force between the first electrode and the second electrode by a voltage applied between the first electrode and the second electrode, (b) the movable section of each microactuator is disposed so as to be movable between a first position where the electrostatic force is increased and a second position where the electrostatic force is reduced or eliminated, and so that a restoring force for restoring the movable section of each microactuator to the second position is generated, (c) the first electrode of each microactuator is electrically connected to one terminal of either one of the first terminal group and the second terminal group, and is not electrically connected to the rest of the terminals of the first and second terminal groups, (d) the second electrode of each microactuator is electrically connected to one terminal of the other of the first terminal group and the second terminal group, and is not electrically connected to the rest of the terminals of the first and second terminal groups, (e) a combination of the one terminal of either one of the first terminal group and the second terminal group electrically connected to the first electrode of each microactuator and the one terminal of the other of the first terminal group and the second terminal group electrically connected to the second electrode of each microactuator is characteristic of each microactuator, (f) at least one terminal of the first terminal group is electrically connected to the first electrodes or the second electrodes of at least two of the plurality of microactuators, and (g) at least one terminal of the second terminal group is electrically connected to the first electrodes or the second electrodes of at least two of the plurality of microactuators. The movable section is formed of, for example, a thin film.

The term "characteristic" in (e) above means that, when any one terminal is selected from the first terminal group and any one terminal is selected from the second terminal group, there is only one microactuator corresponding to these two terminals (that is, there is only one actuator in which the two terminals are electrically connected to the two electrodes, respectively).

In the microactuator array, it is desirable that (a) when m and n are integers equal to or greater than 2, the number of the plurality of microactuators be m×n actuators, (b) the number of terminals of the first terminal group be equal to m, (c) the number of terminals of the second terminal group be equal to n, (d) each terminal of the first terminal group be electrically connected to the first electrodes or the second electrodes of n microactuators of the plurality of microactuators, and (e) each terminal of the second terminal group be electrically connected to the first electrodes or the second electrodes of m microactuators of the plurality of microactuators.

The expression "m×n" simply represents the number of the plurality of microactuators, so that the arrangement of the microactuators is not necessarily limited to a matrix arrangement of m rows×n columns.

A second microactuator device of the present invention comprises the second microactuator, and a controlling section which is connected to the terminals of the first and second terminal groups, and which controls switching between the positions of the movable sections of the respective microactuators by controlling electrical potentials at the respective terminals of the first and second terminal groups.

In the microactuator device, it is desirable that (a) the controlling section is constructed so that each terminal of the first terminal group is settable at first, second, and third electrical potential states, and so that each terminal of the second terminal group is settable at fourth, fifth, and sixth electrical potential states, (b) the magnitudes of electrical potentials of the first to sixth electrical potential states satisfy a relationship: the electrical potential of the first electrical potential state>the electrical potential of the second electrical potential state>the electrical potential of the third electrical potential state≧the electrical potential of the fourth electrical potential state>the electrical potential of the fifth electrical potential state>the electrical potential of the sixth electrical potential state, or satisfy the reverse relationship in magnitude, (c) the difference between the electrical potential of the first electrical potential state and the electrical potential of the sixth electrical potential state be a voltage which moves to the first position the movable section of at least one microactuator, among the plurality of microactuators, having the movable section positioned at the second position when the electrical potential difference is applied between the first and second electrodes of the at least one microactuator, (d) the difference between the electrical potential of the third electrical potential state and the electrical potential of the fourth electrical potential state be a voltage which restores to the second position the movable section of at least one microactuator, among the plurality of microactuators, having the movable section positioned at the first position when the electrical potential difference is applied between the first and second electrodes of the at least one microactuator, (e) the difference between the electrical potential of the third electrical potential state and the electrical potential of the fifth electrical potential state and the difference between the electrical potential of the second electrical potential state and the electrical potential of the fourth electrical potential state be voltages which maintain at the first position and do not restore to the second position the movable section of at least one microactuator, among the plurality of microactuators, having the movable section positioned at the first position when the electrical potential differences are applied between the first and second electrodes of the at least one microactuator, and (f) the difference between the electrical potential of the second electrical potential state and the electrical potential of the fifth electrical potential state be a voltage which maintains at the second position and does not restore to the first position the movable section of at least one microactuator, among the plurality of microactuators, having the movable section positioned at the second position when the electrical potential difference is applied between the first and second electrodes of the at least one microactuator.

Each electrical potential state may be, for example, a state in which the electrical potential does not change with time, a state in which the electrical potential changes in the form of pulses with time, or a state in which the electrical potential sinusoidally changes with time.

In this case, it is desirable that the first electrical potential state and the third electrical potential state be the same.

In the second microactuator array, it is desirable that the movable section of each microactuator have an electrical current path for generating Lorentz force by disposing the electrical path of each microactuator in a magnetic field and passing electrical current.

A third microactuator device of the present invention comprises a microactuator array in which an electrical current path which generates Lorentz force by placing the electrical current path in a magnetic field and passing electrical current is disposed at the movable section of each of the above-described microactuators, a magnetic field generating section for generating the magnetic field, and a controlling section which is electrically connected to each terminal of the first and second terminal groups and the electrical current path of each microactuator array, and which controls switching between the positions of the movable section of each microactuator by controlling an electrical potential of each terminal of the first and second terminal group and the electrical current flowing in the electrical current path of each microactuator array.

In the microactuator device, it is desirable that (a) the controlling section be constructed so that each terminal of the first terminal group is settable at first and second electrical potential states and so that each terminal of the second terminal group is settable at third and fourth electrical potential states, (b) the difference between an electrical potential of the second electrical potential state and an electrical potential of the fourth electrical potential state be a voltage which moves to the first position the movable section of at least one microactuator, among the plurality of microactuators, having the movable section positioned at the second position when the electrical potential difference is applied between the first and second electrodes of the at least one microactuator and when a predetermined electrical current is passed through the electrical current path of the at least one microactuator, (c) the difference between an electrical potential of the first electrical potential state and an electrical potential of a third electrical potential state be a voltage which restores to the second position the movable section of at least one microactuator, among the plurality of microactuators, having the movable section positioned at the first position when the electrical potential difference is applied between the first and second electrodes of the at least one microactuator, and (d) the difference between the electrical potential of the second electrical potential state and the electrical potential of the third electrical potential state and the difference between the electrical potential of the first electrical potential state and the electrical potential of the fourth electrical potential state are voltages which maintain at the first position and do not restore to the second position the movable section of at least one microactuator, among the plurality of microactuators, having the movable section positioned at the first position when the electrical potential differences are applied between the first and second electrodes of the at least one microactuator.

In this case, it is desirable that the first electrical potential state and the third electrical potential state be the same.

An optical switch array of the present invention comprises the second microactuator array, and mirrors disposed at the respective movable sections of the plurality of microactuators.

An optical switch system of the present invention comprises the second or third microactuator device, and mirrors disposed at the respective movable sections of the plurality of microactuators.

DESCRIPTION OF PREFERRED EMBODIMENTS

Hereunder, a microactuator array of the present invention, and a microactuator device, an optical switch array, and an optical switch system, which use the microactuator array, will be described with reference to the drawings.

[First Embodiment]

Figure 1:
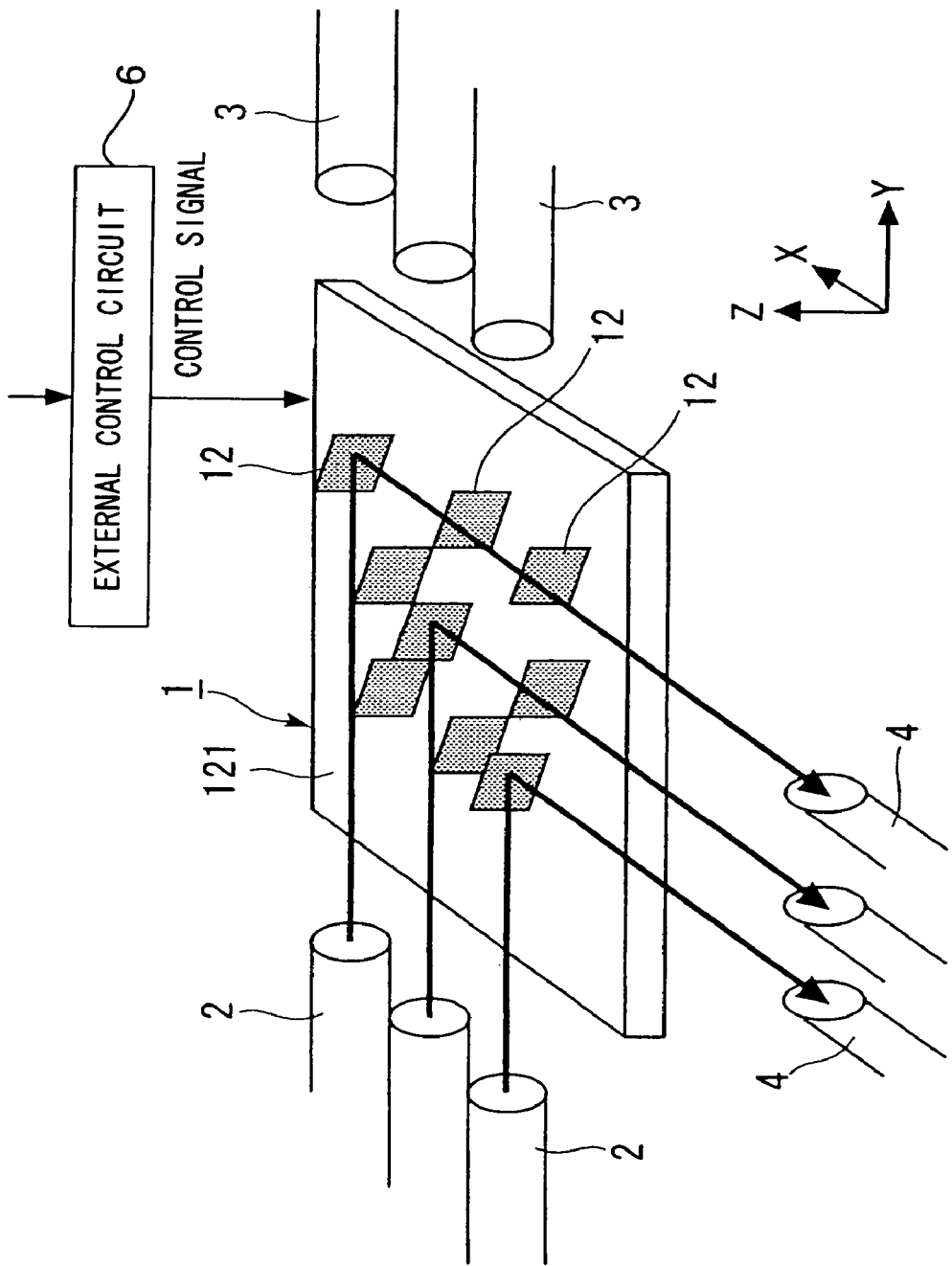
FIG. 1 is a schematic structural view of an example of an optical switch system comprising an optical switch array, in a first embodiment of the present invention.

FIG. 1 is a schematic structural view of an example of an optical switch system comprising an optical switch array 1 in a first embodiment of the present invention. For convenience of explanation, an X axis, a Y axis, and a Z axis, which are perpendicular to each other, are defined as shown in FIG. 1 (and in the following figures). A surface of a substrate 121 of the optical switch array 1 is parallel to an XY plane. The direction of an arrow among directions of the Z axis is called a +Z direction or a +Z side, whereas the opposite direction is called a –Z direction or a –Z side. The same things apply to directions of the X axis and directions of the Y axis. The +Z side and the –Z side are sometimes called an upper side and a lower side, respectively.

As shown in FIG. 1, the optical switch system in the embodiment comprises the optical switch array 1, m optical fibers 2 for light input, m optical fibers 3 for light output, n optical fibers 4 for light output, and an external control circuit 6 serving as a controlling section. The external control circuit 6 responds to an optical path switchover state command signal and supplies to the optical switch array 1 a control signal for achieving an optical path switchover state indicated by the optical path switchover state command signal. In the example shown in FIG. 1, m=3 and n=3, but m and n may be any number, respectively.

As shown in FIG. 1, the optical switch array 1 comprises the substrate 121 and m×n mirrors 12 disposed on the substrate 121. The m optical fibers 2 for light input are disposed in a plane parallel to the XY plane so that incident light is guided with respect to the substrate 121 from one side towards the other side in a Y axis direction. The m optical fibers 3 for light output are disposed at the other side of the substrate 121 so as to oppose the respective m optical fibers 2 for light input, and in the plane parallel to the XY plane so that light traveling in the Y axis direction is incident thereupon without being reflected by any mirror 12 of the optical switch array 1. The n optical fibers 4 for light output are disposed in the plane parallel to the XY plane so that light reflected in an X axis direction by any mirror 12 of the optical switch array 1 is incident thereupon. The m×n mirrors 12 are disposed on the substrate 121 in a two-dimensional matrix (lattice) arrangement so that they can move towards and away from respective intersections of light-exiting paths of the m optical fibers 2 for light input and light-incident paths of the m optical fibers 4 for light output by microactuators 111 (described later). In the embodiment, the orientations of the mirrors 12 are set so that the normal lines are at an angle of 45 degrees from the X axis in the plane parallel to the XY plane. Obviously, this angle may be changed as required. When the angles of the mirrors 12 are to be changed, the orientations and positions of the optical fibers 4 for light output are set in accordance with these angles. FIG. 1 shows a device which performs a switching operation by intersecting light beams in a space. In order to improve coupling with a light beam, a lens is sometimes inserted in one end of each fiber.

The principle of switching optical paths in the optical switch system is the same as the principle of switching optical paths in a related two-dimensional optical switch.

Figure 2:
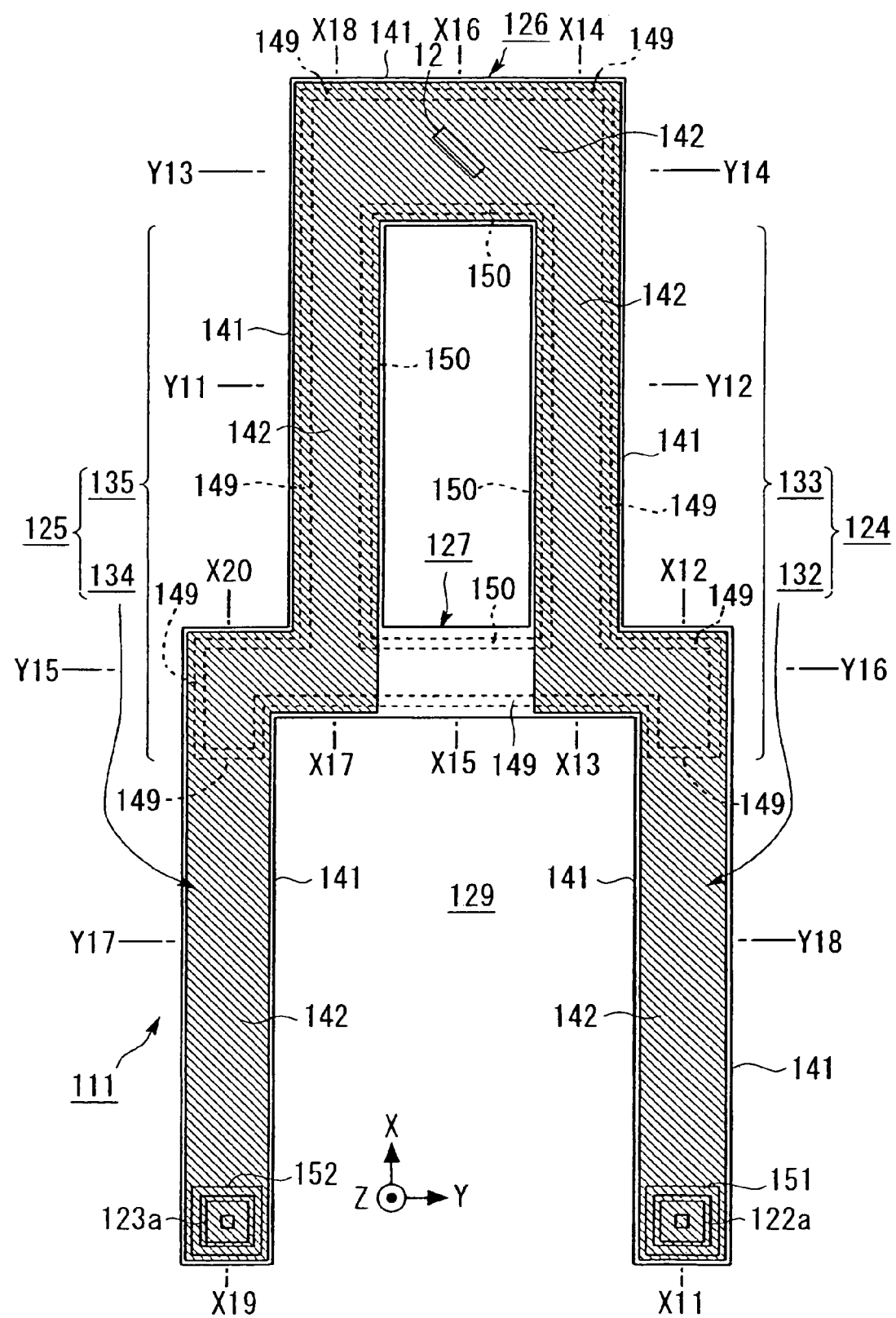
FIG. 2 is a schematic plan view of one optical switch which is a unit element in the optical switch array used in the optical switch system in the first embodiment of the present invention.
Figure 3:
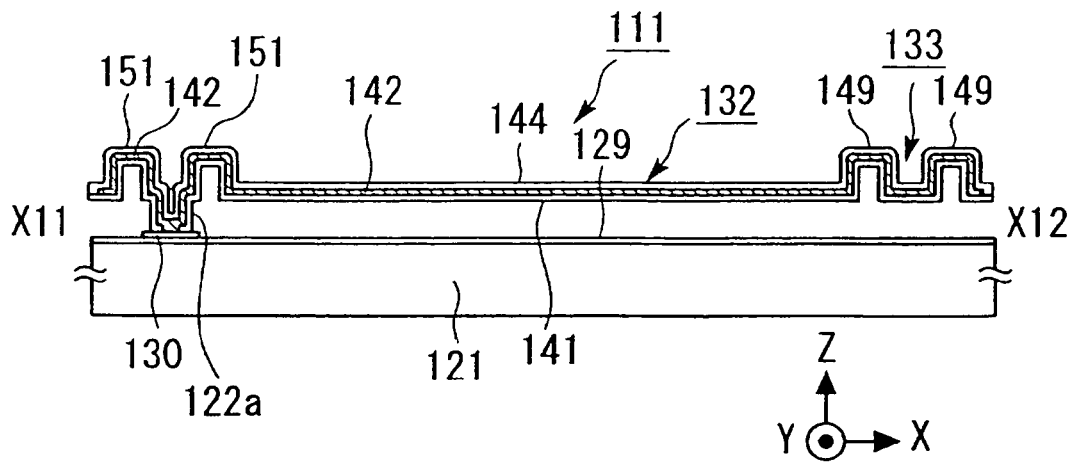
FIG. 3 is a schematic sectional view taken along line X11–X12 in FIG. 2.
Figure 4:
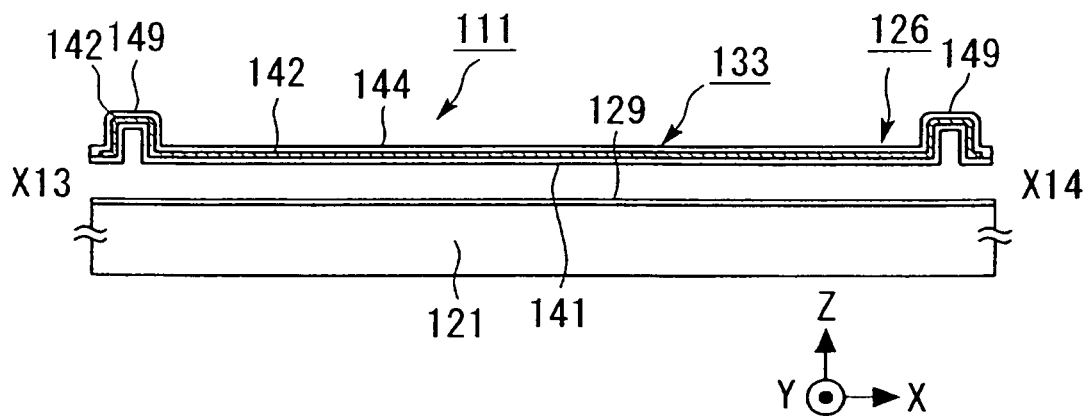
FIG. 4 is a schematic sectional view taken along line X13–X14 in FIG. 2.
Figure 5:
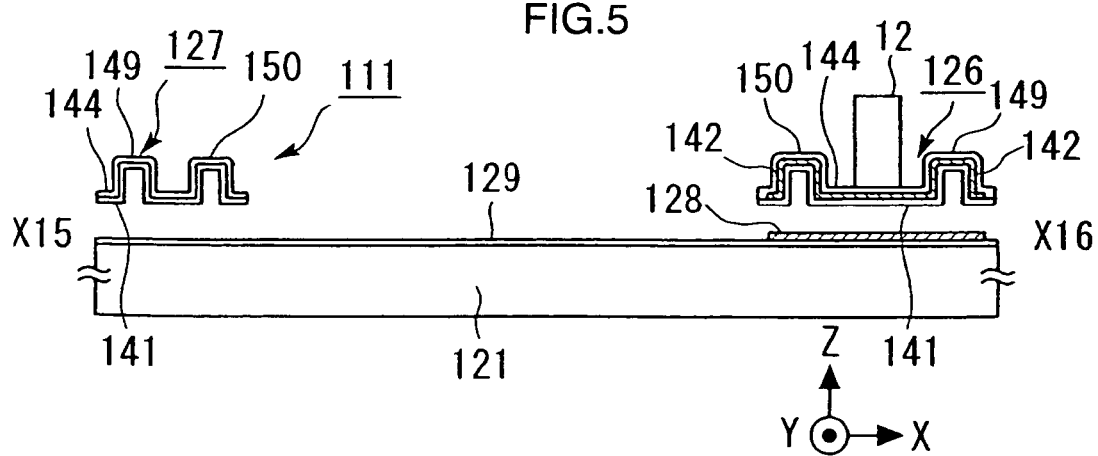
FIG. 5 is a schematic sectional view taken along line X15–X16 in FIG. 2.
Figure 6:
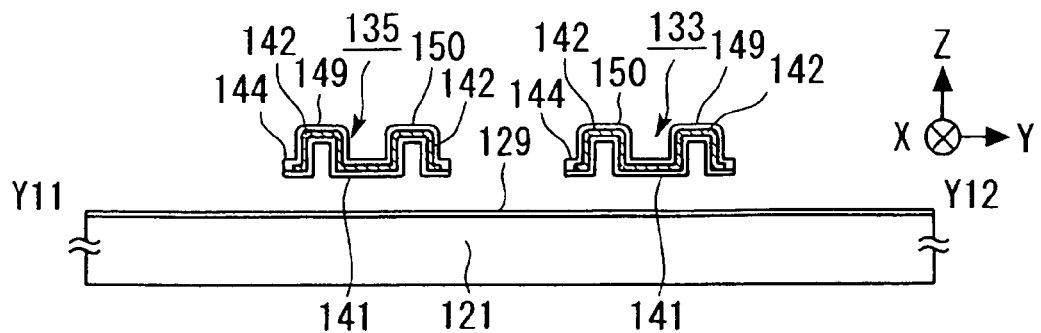
FIG. 6 is a schematic sectional view taken along line Y11–Y12 in FIG. 2.
Figure 7:
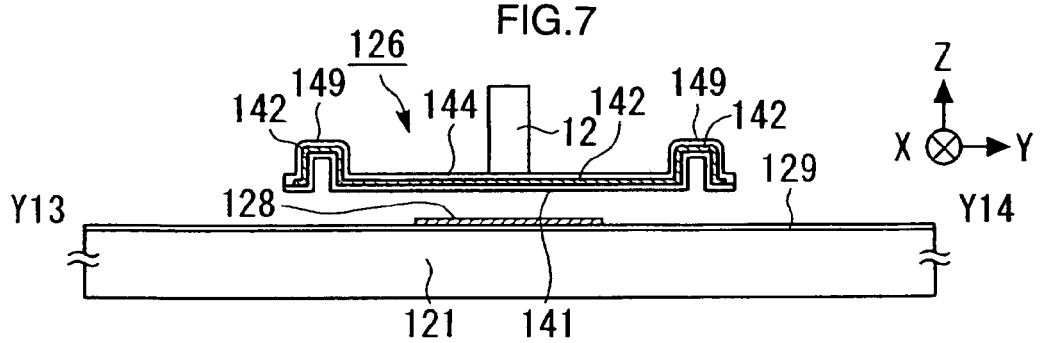
FIG. 7 is a schematic sectional view taken along line Y13–Y14 in FIG. 2.
Figure 8:
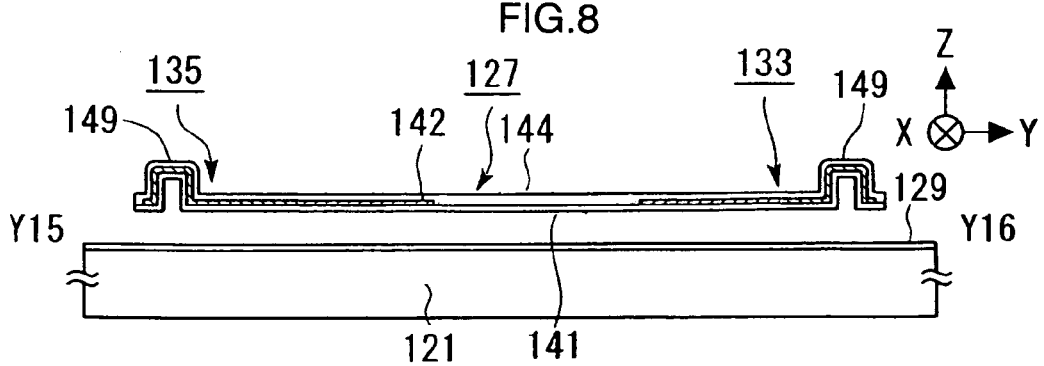
FIG. 8 is a schematic sectional view taken along line Y15–Y16 in FIG. 2.
Figure 9:
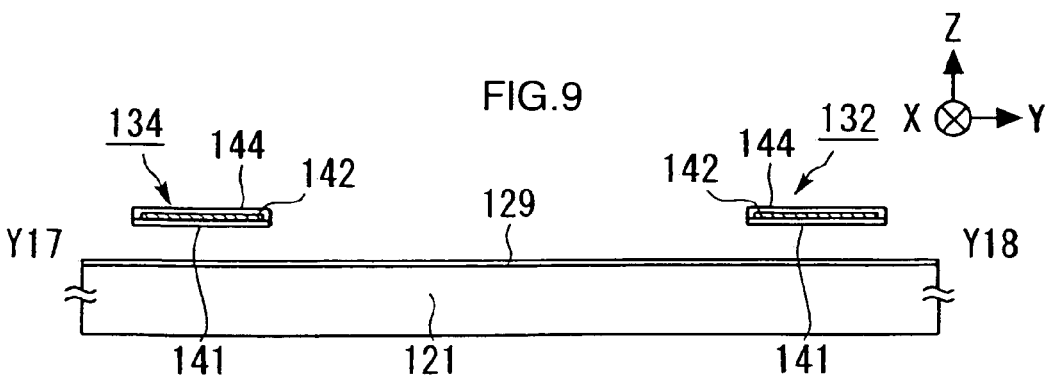
FIG. 9 is a schematic sectional view taken along line Y17–Y18 in FIG. 2.

Next, the structure of one optical switch which is a unit element in the optical switch array 1 in FIG. 1 will be described with reference to FIGS. 2 to 9. FIG. 2 is a schematic plan view of one optical switch (that is, one microactuator 111 and one mirror 12 which is driven thereby) which is a unit element in the optical switch array used in the optical switch system in the first embodiment of the present invention. In FIG. 2, an SiN film 144 serving as a protective film formed over the entire surface of a movable section and legs is not shown, protruding bars 149 and 150, which should actually be drawn with solid lines, are drawn with broken lines, and an Al film 142 is hatched. FIG. 3 is a schematic sectional view taken along line X11–X12 in FIG. 2. Although not shown as a figure, the schematic sectional view taken along line X19–X20 in FIG. 2 is similar to FIG. 3. FIG. 4 is a schematic sectional view taken along line X13–X14 in FIG. 2. Although not shown as a figure, the schematic sectional view taken along line X17–X18 in FIG. 2 is similar to FIG. 4. FIG. 5 is a schematic sectional view taken along line X15–X16 in FIG. 2. FIG. 6 is a schematic sectional view taken along line Y11–Y12 in FIG. 2. FIG. 7 is a schematic sectional view taken along line Y13–Y14 in FIG. 2. FIG. 8 is a schematic sectional view taken along line Y15–Y16 in FIG. 2. FIG. 9 is a schematic sectional view taken along line Y17–Y18 in FIG. 2. Although, in FIGS. 3 to 9, beam structures 132 and 134 are shown as not being bent in a Z axis direction, when a force is not applied to the movable section, the beam structures 132 and 134 are actually bent in the +Z direction by stress of films of the beam structures 132 and 134.

In the embodiment, the microactuator 111 has a cantilever structure. However, as in the aforementioned Japanese Unexamined Patent Application Publication No. 2001-42233, the microactuator may have a structure supported at both sides, using a flexure.

The microactuator 111 used in the embodiment comprises the substrate 121 such as a silicon substrate or a glass substrate; legs 122a and 123a; two strip-shaped beam sections 124 and 125 which primarily extend parallel to each other in an X axis direction in plan view as seen from a Z axis direction; a connecting section 126 which is disposed at an end (a free end or an end in the X axis direction) of the beam section 124 and an end (a free end or an end in the X axis direction) of the beam section 125 for mechanically connecting these ends, and which is rectangular in plan view; a connecting section 127 for mechanically connecting and reinforcing a fixed end of the beam structure 133 of the beam section 124 and a fixed end of the beam structure 135 of the beam section 125; and a fixed electrode (first electrode) 128.

The fixed end (−X direction end) of the beam section 124 is mechanically connected to the substrate 121 through the leg 122a having an upstanding portion from the substrate 121 through a wiring pattern 130 (not shown in FIG. 2) formed of an Al film formed on an insulating film 129, such as a silicon oxide film, disposed on the substrate 121. Similarly, the fixed end (−X direction end) of the beam section 125 is mechanically connected to the substrate 121 through the leg 123a having an upstanding portion from the substrate 121 through a wiring pattern (not shown) formed of Al films formed on the insulating film 129 disposed on the substrate 121. As mentioned above, the free ends of the beam sections 124 and 125 are mechanically connected by the connecting section 126, and the fixed ends of the beam structures 132 and 134 are mechanically connected by the connecting section 127. Therefore, in the embodiment, the beam sections 124 and 125 and the connecting sections 126 and 127 form a movable section having a cantilever structure as a whole. In the embodiment, the substrate 121, the fixed electrode 128, and the insulating film 129 form a fixed section.

The beam section 124 comprises two beam structures 132 and 133 mechanically connected in series in an X axis direction between the fixed end and the free end of the movable section. The beam structure 132 has the shape of a strip which extends in the X axis direction in plan view as seen from a Z axis direction. The beam structure 133 has the shape of a strip, and, as shown in FIG. 2, extends primarily in the X axis direction in plan view as seen from the Z axis direction and is bent in a Y axis direction at the −X side position. The beam structure 132 at the fixed end side (−X side) is a plate spring section which can be flexed in the Z axis directions, whereas the beam structure 133 at the free end side (+X side) is a rigid section which is substantially rigid with respect to flexing in the Z axis directions (in the direction of the substrate 121 and the opposite direction) and in the other directions.

The beam structure 132 is a thin film of three laminated layers comprising a lower SiN film 141, an intermediate Al film 142, and an upper protective SiN film 144, and functions as a plate spring. The Al film 142 of the beam structure 132 is used as part of a wire to a movable electrode for electrostatic force.

The beam structure 133 is a thin film of three laminated layers comprising a lower SiN film 141, an intermediate Al film 142, and an upper protective SiN film 144, which extend continuously from the beam structure 132. By the protruding bars 149 and 150, however, the beam structure 133 has rigidity mentioned above.

Although, in FIG. 3, the beam structure 132 is shown as not being bent in a Z axis direction, when a drive signal is not supplied, the beam structure 132 is actually bent upwards (in a direction opposite to the substrate 121 or the +Z direction) by the stress of the films 141, 142, and 144. Such a bent state can be achieved by properly setting the film deposition conditions of the films 141, 142, and 144. In contrast, the beam structure 133 is substantially not bent in a Z axis direction regardless of whether or not a drive signal is supplied, so that, by the aforementioned rigidity, the beam structure 133 is always maintained in the shape of a plate without being bent by the stress of the films 141, 142, and 144. Accordingly, the beam structure 132 and the beam structure 133 are in a bent state or an unbent state, respectively, when a force is not applied to the beam section 124.

In the embodiment, the leg 122a is formed by continuously extending the SiN films 141 and 144 and the Al film 142 forming the beam structure 132 as they are. The Al film 142 is electrically connected to the wiring pattern 130 through an opening formed in the SiN film 141 at the leg 122a. In order to make the leg 122a stronger, a protruding bar 151 having a rectangular shape in plan view as seen from a Z axis direction is formed at the top portion of the leg 122a.

The beam section 125 and the leg 123a have exactly the same structures as the beam section 124 and the leg 122a, respectively. The beam structures 134 and 135 of the beam section 125 correspond to the beam structures 132 and 133 of the beam section 124, respectively. A protruding bar 152 corresponding to the aforementioned protruding bar 151 is formed at the top portion of the leg 123a.

The connecting section 127 is formed of the two SiN films 141 and 144 extending continuously from the beam structures 133 and 135. The Al film 142 does not extend to the connecting section 127 from the beam structures 133 and 135. Therefore, the connecting section 127 is not electrically connected at all.

In the embodiment, in order to impart rigidity to the beam structures 133 and 135 and the connecting sections 126 and 127 all together, as shown by the broken lines in FIG. 2, the protruding bar 149 is formed around the outer periphery of an area including these structures and sections in plan view, and the protruding bar 150 is formed along the inner periphery of the area including these structures and sections. By the protruding bars 149 and 150, the beam structures 133 and 135 are reinforced and made rigid. The beam structures 133 and 135 are substantially not bent in a Z axis direction regardless of whether or not a drive signal is supplied, so that, by the aforementioned rigidity, the beam structures 133 and 135 are always maintained in the shape of a plate without being bent by the stress of the films 141, 142, and 144.

The connecting section 126 is formed by continuously extending the SiN films 141 and 144 and the Al film 142 forming the beam structures 133 and 135 as they are. A mirror 12 serving as a member to be driven and formed of a metal such as Au or Ni is disposed at the connecting section 126.

The portion of the Al film 142 at the connecting section 126 is also used as a movable electrode (second electrode) for electrostatic force. The fixed electrode 128 for electrostatic force, which is formed of an Al film, is disposed on an area of the substrate 121 opposing the movable electrode. Although not shown, the Al film of the fixed electrode 128 extends as a wiring pattern. By using this wiring pattern along with the wiring pattern 130, a voltage (for electrostatic force) can be applied between the fixed electrode 128 and the Al film 142 of the connecting section 126 serving as a movable electrode.

As can be understood from the foregoing description, in the embodiment, the movable section comprising the beam sections 124 and 125 and the connecting sections 126 and 127 is such as to be movable vertically (in the Z axis directions) with respect to the fixed section comprising the substrate 121, the fixed electrode 128, and the insulating film 129. More specifically, in the embodiment, the movable section is movable between an upper position to which the movable section tries to return by springiness of the beam structures 132 and 134 of the plate springs and a lower position where the connecting section 126 comes into contact with the fixed electrode 128. At the upper position, the distance between the movable electrode (portion of the Al film 142 at the connecting section 126) of the movable section and the fixed electrode 128 of the fixed section is increased, thereby reducing or eliminating the electrostatic force generated between the electrodes. At the lower position, the distance between the movable electrode (portion of the Al film 142 at the connecting section 126) of the movable section and the fixed electrode 128 of the fixed section is reduced, thereby increasing the electrostatic force generated between the electrodes. When the voltage between both electrodes is sufficiently small, the movable section returns to the upper position by the aforementioned springiness. Accordingly, in the description below, the upper position is sometimes called an unclamp position. In contrast, when the voltage between both electrodes is sufficiently large, the movable section is clamped at the lower position by the electrostatic force opposing the aforementioned springiness. Accordingly, in the description below, the lower position is sometimes called a clamp position.

One end of each of the beam sections 124 and 125 is fixed at the fixed electrode, whereas the other end of each of the beam sections 124 and 125 is movable relative to the fixed electrode. When the voltage between both electrodes is sufficiently large, the movable electrode moves so as to be attracted to the fixed electrode.

Figure 11:
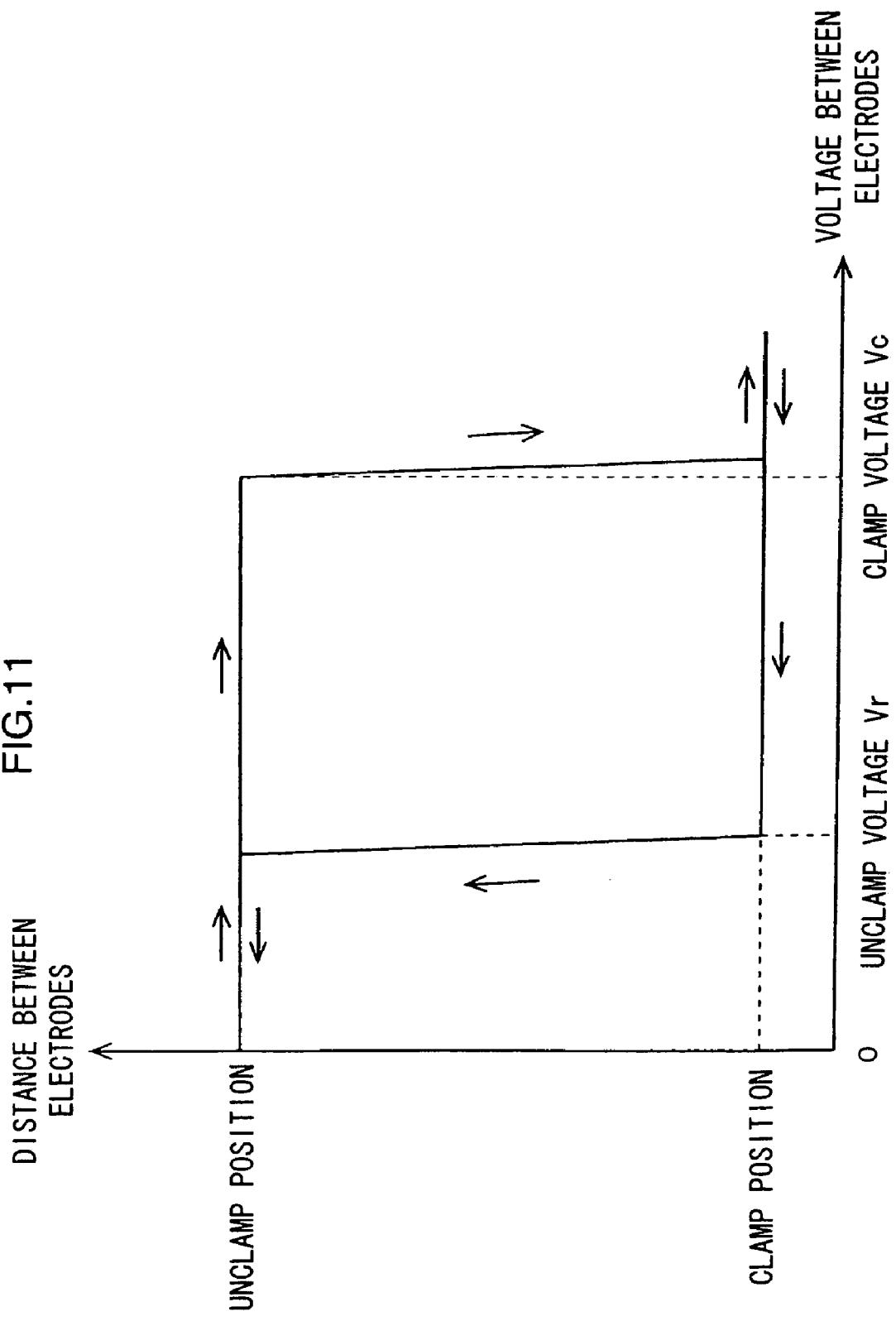
FIG. 11 is a graph illustrating the relationship between the voltage between a fixed electrode and a movable electrode and the distance between the electrodes, in electrostatic driving.

Here, the relationship between the voltage between both electrodes and the distance between both electrodes (this distance represents the position of the movable section) in the above-described one microactuator 111 is illustrated in FIG. 11. When the voltage between the electrodes is 0 V, the movable section is at the unclamp position. When the voltage between the electrodes gradually increases from 0 V and becomes equal to a clamp voltage Vc, the electrostatic force becomes larger than the springiness, so that the movable electrode is attracted to the fixed electrode, as a result of which the movable section is moved to the clamp position. A further increase in the voltage does not change the position of the movable section. Next, even if, from this value, the voltage between the electrodes is gradually reduced to a value equal to or less than the clamp voltage Vc, the movable section is not immediately unclamped. When the voltage between the electrodes reaches an unclamp voltage Vr, which is less than the clamp voltage Vc, the springiness becomes greater than the electrostatic force, so that the movable section is unclamped and returned to its unclamp position. Accordingly, there is hysteresis between the distance and voltage between the electrodes. The hysteresis results from the electrostatic force varying depending upon the electrode positions because the electrostatic force is inversely proportional to the square of the distance between the electrodes. Hysteresis is exhibited not only in microactuators having the above-described structure, but also generally in microactuators making use of electrostatic force.

Therefore, in the embodiment, by controlling the voltage between the electrodes, it is possible to hold the mirror 12 at an upper side (side opposite to the substrate 121) and at a lower side (side of the substrate 121). In the embodiment, as described later, such a controlling operation is carried out.

Figure 10:
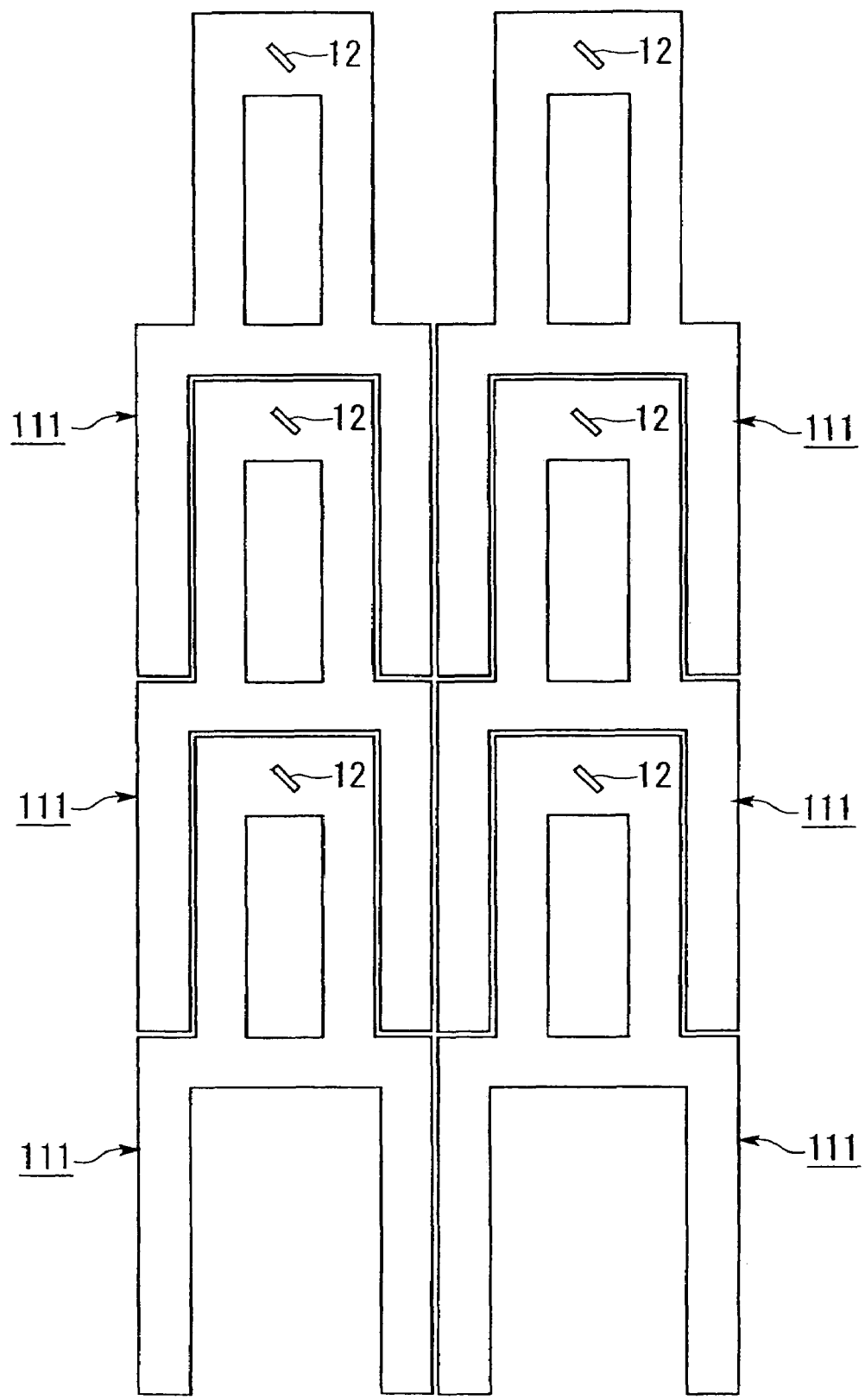
FIG. 10 is a schematic plan view of the optical switch array used in the optical switch system in the first embodiment of the present invention.

In the embodiment, as shown in FIG. 10, a plurality of optical switches each comprising a mirror 12 and a microactuator 111 for driving the mirror 12 are two-dimensionally disposed in a matrix on the substrate 121, and form an optical switch array. In the embodiment, as shown in FIG. 2, the beam structures 133 and 135 are bent in the Y axis directions at the −X side position in plan view as seen from a Z axis direction. By this, since the beam sections 124 and 125 are bent in the Y axis directions, when, as shown in FIG. 10, the plurality of microactuators 111 are two-dimensionally disposed on the substrate 121, they can be disposed closer together. In other words, since the beam sections 124 and 125 are two-dimensionally bent, a portion of the beam section 124 and a portion of the beam section 125 of one microactuator are two-dimensionally superimposed on the beam sections 124 and 125 of an adjacent microactuator. That is, in FIG. 10, the beam structures 132 and 134 of an upper microactuator 111 are vertically superimposed on the beam structures 133 and 135 of a lower microactuator 111. FIG. 10 is a schematic plan view of the optical switch array in the optical switch system in the embodiment.

In the embodiment, although the SiN films 144 serving as protective films are formed over the entire surface of the movable section and the legs of each microactuator 111, the SiN films 144 do not have to be formed.

Figure 12:
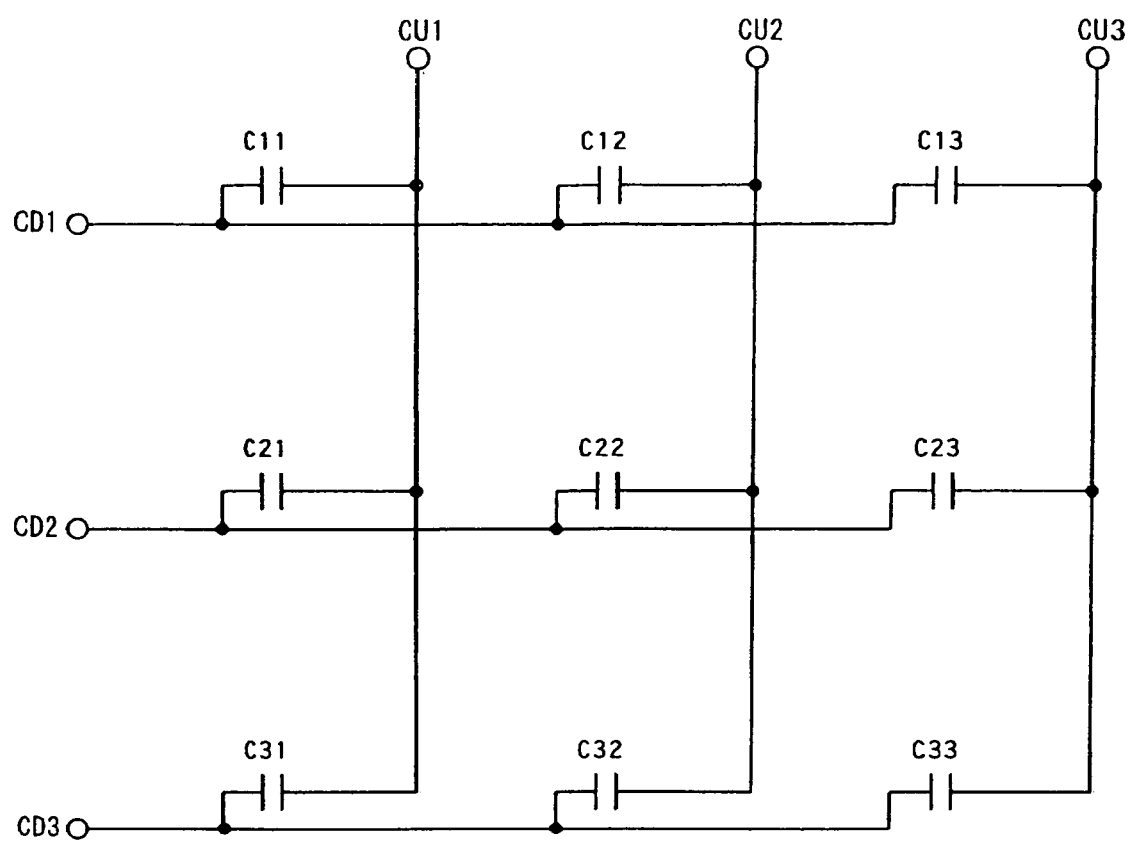
FIG. 12 is an electrical circuit diagram illustrating the optical switch array used in the optical switch system in the first embodiment of the present invention.

FIG. 12 is an electrical circuit diagram illustrating the optical switch array used in the embodiment. The single optical switch shown in FIGS. 2 to 9 may be regarded as one capacitor (corresponding to a capacitor comprising the fixed electrode 128 and the movable electrode (portion of the Al film 142 at the connecting section 126)) in terms of an electrical circuit. In FIG. 12, a capacitor (optical switch) of an m row and n column is represented as Cmn. For example, the upper left capacitor (optical switch) (in the first row and first column) in FIG. 12 is represented as C11. In the embodiment, the left electrode and right electrode in FIG. 12 of each capacitor are a fixed electrode and a movable electrode, respectively. Obviously, for any number of capacitors equal to or greater than one, the electrical connection relationship between the fixed electrode and the movable electrode can obviously be reversed.

In FIG. 12, for convenience of explanation, nine optical switches are disposed in three rows and three columns. The number of optical switches is not limited in any way. Accordingly, when, for example, optical switches are disposed in 100 rows and 100 columns, the principle is the same. For the same number of optical switches, the number of rows and columns do not have to be the same, or they do not have to be disposed in a matrix. For example, if there are nine optical switches, they may be disposed in one row and nine columns, or, if there are 16 optical switches, they may be disposed in four rows and four columns, 1 row and 16 columns, or two rows and eight columns.

As shown in FIG. 12, the optical switch array used in the embodiment comprises a first terminal group comprising a plurality of terminals CD1 to CD3 and a second terminal group comprising a plurality of terminals CU1 to CU3. These terminals CD1 to CD3 and CU1 to CU3 are external connection terminals for connection to the external control circuit 6 shown in FIG. 1. In the embodiment, the wiring pattern 130 below the aforementioned leg 122a of each optical switch and the wiring pattern (not shown) below the leg 123a of each optical switch are used to achieve the electrical connection shown in FIG. 12. The terminals CD1 to CD3 and the terminals CU1 to CU3 may be formed by, for example, using part of these wiring patterns as electrode pads. Although the wiring pattern 130 below the legs 122a and the wiring pattern below the leg 123a are used in each optical switch, only one of them need to be used.

In FIG. 12, the number of terminals CD1 to CD3 of the first terminal group is three, which is the same as the number of rows of the optical switches, and the number of terminals CU1 to CU3 of the second terminal group is also three, which is the same as the number of columns of the optical switches. The number of terminals of the first and second terminal groups do not necessarily have to be the same as the number of rows and columns of the optical switches, respectively, as long as, for example, the following Conditions (a) to (e) are satisfied: (a) the fixed electrode 128 of each microactuator 111 is electrically connected to one terminal of either one of the first and second terminal groups and is not electrically connected to the rest of terminals of the first and second terminal groups, (b) the movable electrode of each microactuator 111 is electrically connected to one terminal of either of the other of the first and second terminal groups and is not electrically connected to the rest of the terminals of the first and second terminal groups, (c) a combination of the one terminal of either the first or second terminal group electrically connected to the fixed electrode 128 in each microactuator 111 and the one terminal of either the first or second terminal group electrically connected to the movable electrode in each microactuator 111 is characteristic of each microactuator 111, (d) at least one terminal of the first terminal group is electrically connected in common to the fixed electrodes 128 or the movable electrodes of two or more of the microactuators 111 in the optical switch array, and (e) at least one terminal of the second terminal group is electrically connected in common to the fixed electrodes 128 or movable electrodes of two or more of the microactuators 111 in the optical switch array.

The electrical connections under Conditions (a) to (e) refer to connection in terms of DC voltage. Therefore, the fixed electrode and the movable electrode of each capacitor are separated in terms of DC voltage.

In the example shown in FIG. 12, which satisfies the Conditions (a) to (e), the fixed electrodes 128 of the capacitors C11, C12, and C13 in the first row are electrically connected in common to the terminal CD1 of the first terminal group, and are not electrically connected to the rest of the terminals. The fixed electrodes 128 of the capacitors C21, C22, and C23 in the second row are electrically connected in common to the terminal CD2 of the first terminal group, and are not electrically connected to the rest of the terminals. The fixed electrodes 128 of the capacitors C31, C32, and C33 in the third row are electrically connected in common to the terminal CD3 of the first terminal group, and are not electrically connected to the rest of the terminals. The movable electrodes of the capacitors C11, C21, and C31 in the first column are electrically connected in common to the terminal CU1 of the second terminal group, and are not electrically connected to the rest of the terminals. The movable electrodes of the capacitors C12, C22, and C32 in the second column are electrically connected in common to the terminal CU2 of the second terminal group, and are not electrically connected to the rest of the terminals. The movable electrodes of the capacitors C13, C23, and C33 in the third column are electrically connected in common to the terminal CU3 of the second terminal group, and are not electrically connected to the rest of the terminals.

As shown in FIG. 12, an address circuit, a column selecting switch, a row selecting switch, etc., are not disposed in the optical switch array used in the embodiment.

The optical switch array used in the embodiment may be manufactured by making use of technologies for manufacturing semiconductors, such as a film forming technology and patterning, etching, and a sacrificial layer forming/removing technology. The mirrors 12 are formed by a method disclosed in, for example, the aforementioned Japanese Unexamined Patent Application Publication No. 2001-42233. In the method, recesses corresponding to the mirrors 12 are formed in a resist. Then, a metal 38, such as Au or Ni, used to form the mirrors 12 by electrolytic plating is grown, after which the resist is removed, thereby forming the mirrors 12.

In the embodiment, the external control circuit 6 in FIG. 1 is connected to the terminals CD1 to CD3 and to the terminals CU1 to CU3 in order to separately control the electrical potentials of these terminals, thereby controlling the optical path switchover state of each optical switch of the optical switch array. The external control circuit 6 responds to an optical path switchover state command signal and supplies as an electrical potential a control signal for achieving an optical path switchover state indicated by the optical path switchover state command signal to each of the terminals CD1 to CD3 and CU1 to CU3. The external control circuit 6 selectively supplies an electrical potential to each of the terminals CD1 to CD3 and CU1 to CU3. In the embodiment, as described below, the external control circuit 6 controls the electrical potentials applied to the respective terminals CD1 to CD3 and CU1 to CU3 while properly making use of the hysteresis illustrated in FIG. 11 which each microactuator 111 possesses in order to control the electrical potential between both electrodes of each microactuator 111, thereby achieving each optical path switchover state. Details of a circuit structure, itself, of the external control circuit 6 are apparent from the operation example described below.

Figure 13:
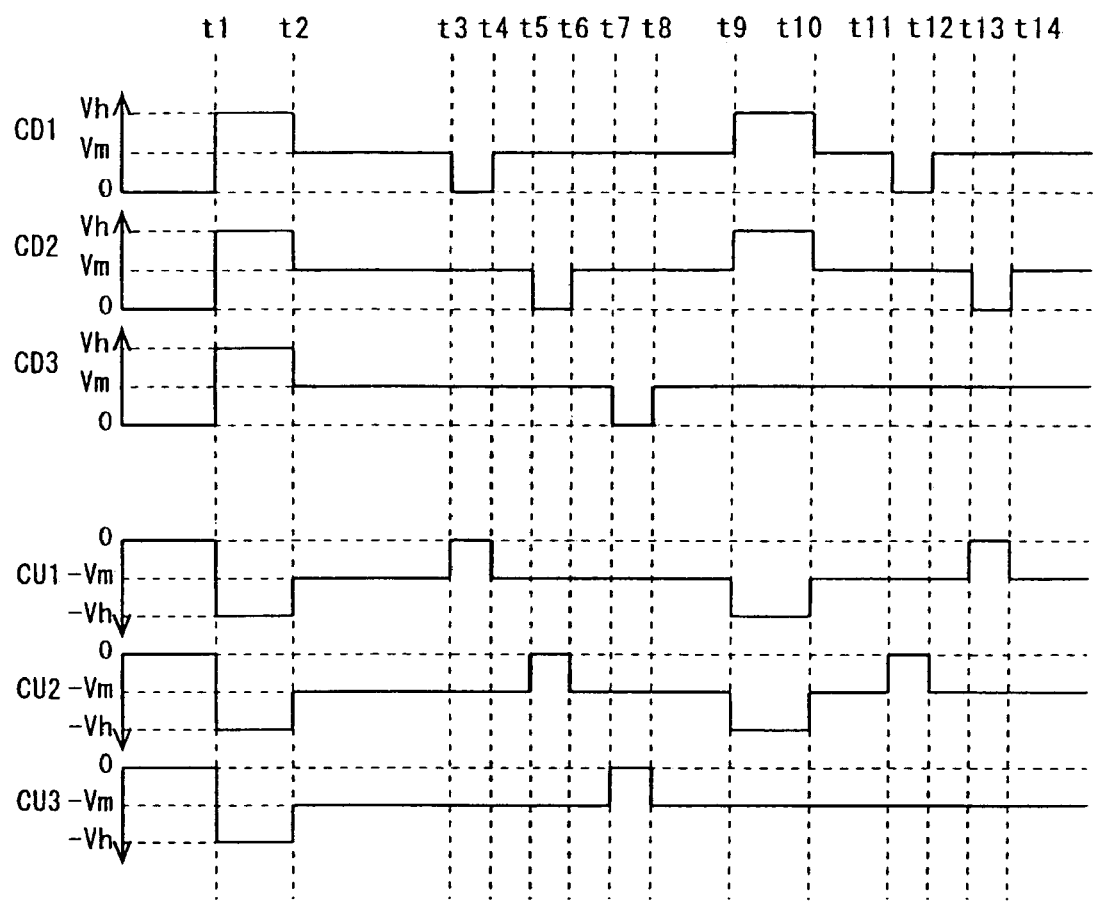
FIG. 13 is a timing chart of electrical potentials which an external control circuit applies to terminals in the optical switch system in the first embodiment of the present invention.

FIG. 13 illustrates an example of a timing chart of electrical potentials that the external control circuit 6 applies to the terminals CD1 to CD3 and CU1 to CU3. In the example shown in FIG. 13, the external control circuit 6 applies any one of three electrical potentials Vh, Vm, and 0 to the terminals CD1 to CD3 of the first terminal group, and applies any one of three electrical potentials −Vh, −Vm, and 0 to the terminals CU1 to CU3 of the second terminal group. Here, Vh and Vm are positive values with 0 as a reference value, and Vh is greater than Vm. It goes without saying that, if the relationship between the absolute values of the electrical potentials are not changed, they may be set with reference to any electrical potential level.

In the example shown in FIG. 13, prior to a time t1, electrical potentials of the terminals CD1 to CD3 and CU1 to CU3 are 0. By this, the voltages between the electrodes of all nine actuators 111 are 0 V, so that all actuators 111 are in an unclamp state (in which the movable sections are at the unclamp positions (upper positions)).

At the time t1, the electrical potentials of the terminals CD1 to CD3 are increased to Vh, whereas the electrical potentials of the terminals CU1 to CU3 are reduced to −Vh. By this, the voltages (electrical potential differences) between the electrodes of all nine actuators 111 become equal to 2×Vh. Here, each Vh is set so that 2×Vh is greater than the clamp voltage Vc shown in FIG. 11. For example, if the clamp voltage Vc is 15 V, each Vh is set at 8 V. By this, the voltages between the electrodes of all nine actuators 111 are equal to or greater than the clamp voltage Vc, so that all of the actuators 111 are clamped (in which their movable sections are at the clamp positions (lower positions)).

At a time t2, the electrical potentials of the terminals CD1 to CD3 are reduced to Vm, whereas the electrical potentials of the terminals CU1 to CU3 are increased to −Vm. By this, the voltages between the electrodes of all nine actuators 111 become equal to 2×Vm. Here, each Vm is set so that it is greater than the unclamp voltage Vr shown in FIG. 11 and so that 2×Vm is less than the clamp voltage Vc. For example, if the unclamp voltage Vr is 5 V and the clamp voltage Vc is 15 V, each Vm is set at 6 V. By this, the voltages equal to 2×Vm between the electrodes of all nine actuators 111 are equal to or greater than the unclamp voltage Vr, so that all of the actuators 111 remain in a clamp state.

At a time t3, the electrical potential of the terminal CD1 is reduced to 0, and the electrical potential of the terminal CU1 is increased to 0. By this, the voltage between the electrodes of the actuator 111, among the nine actuators 111, of the capacitor C11 becomes 0. Therefore, the voltage between the electrodes becomes equal to or less than the unclamp voltage, so that the actuator 111 of the capacitor C11 is unclamped. In contrast, although the voltages between the electrodes of the capacitors C12, C13, C21, and C31 are reduced to Vm, the voltages Vm are greater than the unclamp voltage Vr. Therefore, the microactuators 111 of the capacitors C12, C13, C21, and C31 remain clamped. The voltages between the electrodes of the capacitors C22, C23, C32, and C33 are kept equal to 2×Vm, so that the actuators 111 of the capacitors C22, C23, C32, and C33 remain clamped.

At a time t4, the electrical potential of the terminal CD1 is increased to Vm, and the electrical potential of the terminal CU1 is reduced to −Vm. By this, the voltages between the electrodes of the capacitors C11, C12, C13, C21, and C31 are increased to 2×Vm. Since the voltages equal to 2×Vm between the electrodes are greater than the unclamp voltage Vr and less than the clamp voltage Vc, the actuator 111 of the capacitor C11 remains unclamped, whereas the actuators 111 of the capacitors C12, C13, C21, and C31 remain clamped. Since the voltages between the electrodes of the capacitors C22, C23, C32, and C33 are kept equal to 2×Vm, the actuators 111 of the capacitors C22, C23, C32, and C33 remain clamped. Accordingly, at the time t4, none of the actuators 111 change states.

At a time t5, the electrical potential of the terminal CD2 is reduced to 0, and the electrical potential of the terminal CU2 is increased to 0. By this, the voltage between the electrodes of the actuator 111, among the nine actuators 111, of the capacitor C22 becomes 0. Therefore, the voltage between the electrodes becomes equal to or less than the unclamp voltage Vr, so that the actuator 111 of the capacitor C22 is unclamped. In contrast, although the voltages between the electrodes of the capacitors C12, C21, C23, and C32 are reduced to Vm, the voltages Vm are greater than the unclamp voltage Vr. Therefore, the microactuators 111 of the capacitors C12, C21, C23, and C32 remain clamped. The voltages between the electrodes of the capacitors C11, C13, C31, and C33 are kept equal to 2×Vm. Therefore, the actuator 111 of the capacitor C11 remains unclamped, and the actuators 111 of the capacitors C13, C31, and C33 remain clamped.

At a time t6, the electrical potential of the terminal CD2 is increased to Vm, and the electrical potential of the terminal CU2 is reduced to −Vm. By this, the voltages between the electrodes of the capacitors C12, C21, C22, C23, and C32 are increased to a value equal to 2×Vm. Since the voltages equal to 2×Vm between the electrodes are greater than the unclamp voltage Vr and less than the clamp voltage Vc, the actuator 111 of the capacitor C22 remains unclamped, and the actuators 111 of the capacitors C12, C21, C23, and C32 remain clamped. Since the voltages between the electrodes of the capacitors C11, C13, C31, and C33 are kept equal to 2×Vm, the actuator 111 of the capacitor C11 remains unclamped, and the actuators 111 of the capacitors C13, C31, and C33 remain clamped. Accordingly, at the time t6, none of the actuators 111 change states.

At a time t7, the electrical potential of the terminal CD3 is reduced to 0, and the electrical potential of the terminal CU3 is increased to 0. By this, the voltage between the electrodes of the actuator 111, among the nine actuators 111, of the capacitor C33 becomes 0. Therefore, the voltage between the electrodes becomes equal to or less than the unclamp voltage, so that the actuator 111 of the capacitor C33 is unclamped. In contrast, although the voltages between the electrodes of the capacitors C13, C23, C31, and C32 are reduced to Vm, the Vm values are greater than the unclamp voltage Vr. Therefore, the microactuators 111 of the respective capacitors C13, C23, C31, and C32 remain clamped. The voltages between the electrodes of the capacitors C11, C12, C21, and C22 are kept equal to 2×Vm, so that the actuators 111 of the capacitors C11 and C22 remain unclamped, and the actuators 111 of the capacitors C12 and C21 remain clamped.

At a time t8, the electrical potential of the terminal CD3 is increased to Vm, and the electrical potential of the terminal CU3 is reduced to −Vm. The voltages between the electrodes of the capacitors C13, C23, C31, C32, and C33 are increased to a value equal to 2×Vm. Since the voltages equal to 2×Vm between the electrodes are greater than the unclamp voltage Vr and less than the clamp voltage Vc, the actuator 111 of the capacitor C33 remains unclamped, and the actuators 111 of the capacitors C13, C23, C31, and C32 remain clamped. Since the voltages between the electrodes of the capacitors C11, C12, C21, and C22 are kept equal to 2×Vm, the actuators 111 of the capacitors C11 and C22 remain unclamped, and the actuators 111 of the capacitors C12 and C21 remain clamped. Accordingly, at the time t8, none of the actuators 111 change states.

Up to now, a method of clamping all of the actuators 111 once, and, then, unclamping any of the clamped actuators 111 has been described.

Next, a method of clamping any particular unclamped actuator and, then, unclamping a different actuator will be described below.

At a time t9, the electrical potentials of the terminals CD1 and CD2 are increased to Vh, and the electrical potentials of the terminals CU1 and CU2 are reduced to −Vh. The voltages between the electrodes of the capacitors C11 and C22 become equal to 2×Vh, that is, equal to or greater than the clamp voltage, so that the actuators 111 of the capacitors C11 and C22 are clamped again. The voltages between the electrodes of the capacitors C12 and C21 become equal to 2×Vh, and the voltages between the electrodes of the capacitors C13, C23, C31, and C32 become equal to Vm+Vh. Since the voltages between these electrodes are greater than the unclamp voltage Vr, the actuators 111 of the already clamped capacitors C12, C13, C21, C23, C31, and C32 remain clamped. Since the voltage between the electrodes of the capacitor C33 is kept equal to 2×Vm, the actuator 111 of the capacitor C33 remains unclamped.

At a time t10, the electrical potentials of the terminals CD1 and CD2 are reduced to Vm, and the electrical potentials of the terminals CU1 and CU2 are increased to −Vm. By this, the voltages between the electrodes of the capacitors C11, C12, C13, C21, C22, C23, C31, and C32 become equal to 2×Vm, which values are greater than the unclamp voltage Vr. Therefore, the actuators 111 of the capacitors C11, C12, C13, C21, C22, C23, C31, and C32 remain clamped. Since the voltage between the electrodes of the capacitor C33 is kept equal to 2×Vm, the actuator 111 of the capacitor C33 remains unclamped. Accordingly, at the time t10, none of the actuators 111 change states.

At a time t11, the electrical potential of the terminal CD1 is reduced to 0, and the electrical potential of the terminal CU2 is increased to 0. By this, the voltage between the electrodes of the capacitor C12 becomes 0. Accordingly, since the voltage between the electrodes becomes equal to or less than the unclamp voltage Vr, the actuator 111 of the capacitor C12 is unclamped. In contrast, the voltages between the electrodes of the capacitors C11, C13, C22, and C32 are reduced to Vm, which values are greater than the unclamp voltage Vr. Therefore, the microactuators 111 of the capacitors C11, C13, C22, and C32 remain clamped. The voltages between the electrodes of the capacitors C21, C23, C31, and C33 are kept equal to 2×Vm, so that the actuator 111 of the capacitor C33 remains unclamped, and the actuators 111 of the capacitors C21, C23, and C31 remain clamped.

At a time t12, the electrical potential of the terminal CD1 is increased to Vm, and the electrical potential of the terminal CU2 is reduced to −Vm. By this, the voltages between the electrodes of the capacitors C11, C12, C13, C22, and C32 are increased to a value equal to 2×Vm. The voltages equal to 2×Vm between the electrodes are greater than the unclamp voltage Vr and less than the clamp voltage Vc, so that the actuator 111 of the capacitor C12 remains unclamped, and the actuators 111 of the capacitors C11, C13, C22, and C32 remain clamped. Since the voltages between the electrodes of the capacitors C21, C23, C31, and C33 are kept equal to 2×Vm, the actuator 111 of the capacitor 33 remains unclamped, and the actuators 111 of the capacitors C21, C23, and C31 remain clamped. Accordingly, at the time t12, none of the actuators 111 change states.

At a time t13, the electrical potential of the terminal CD2 is reduced to 0, and the electrical potential of the terminal CU1 is increased to 0. By this, the voltage between the electrodes of the capacitor C21 becomes 0. Therefore, since the voltage between the electrodes becomes equal to or less than the unclamp voltage Vr, the actuator 111 of the capacitor C21 is unclamped. In contrast, the voltages between the electrodes of the capacitors C11, C22, C23, and C31 are reduced to Vm, which values are greater than the unclamp voltage Vr, so that the microactuators 111 of the capacitors C11, C22, C23, and C31 remain clamped. Since the voltages between the electrodes of the capacitors C12, C13, C32, and C33 are kept equal to 2×Vm, the actuators 111 of the capacitors C12 and C33 remain unclamped, and the actuators 111 of the capacitors C13 and C32 remain clamped.

At a time t14, the electrical potential of the terminal CD2 is increased to Vm, and the electrical potential of the terminal CU1 is reduced to −Vm. By this, the voltages between the electrodes of the capacitors C11, C21, C22, C23, and C31 are increased to values equal to 2×Vm. Since the voltages equal to 2×Vm between the electrodes are greater than the unclamp voltage Vr and less than the clamp voltage Vc, the actuator 111 of the capacitor C21 remains unclamped, and the actuators 111 of the capacitors C11, C22, C23, and C31 remain clamped. Since the voltages between the electrodes of the capacitors C12, C13, C32, and C33 are kept equal to 2×Vm, the actuators 111 of the capacitors C12 and C33 remain unclamped, and the actuators 111 of the capacitors C13 and C32 remain clamped. Accordingly, at the time t14, none of the actuators 111 change states.

Up to now, it has been described that, from the time any of the actuators 111 is unclamped, it is possible to clamp any particular unclamped actuator 111, and, then, unclamp a different actuator 111 without affecting the remaining actuators.

In the description up to now, it is assumed that the clamp voltages Vc and the unclamp voltages Vr of all of the actuators 111 are the same. Actually, the voltages Vc and Vr of the actuators 111 are different. In the embodiment, considering the differences, when a maximum value and a minimum value among the clamp voltages Vc of all of the actuators 111 are represented by Vcmax and Vcmin, respectively, and a maximum value and a minimum value among the unclamp voltages Vr are represented by Vrmax and Vrmin, respectively, they are set so that the following Relational Expressions (1) to (4) are established.

$$2 \times Vh > Vcmax \quad (1)$$

$$Vm > Vrmax \quad (2)$$

$$2 \times Vm < Vcmin \quad (3)$$

$$Vrmin > 0 \quad (4)$$

Here, Comparative Examples 1 and 2 for comparison with the embodiment will be described.

Figure 14:
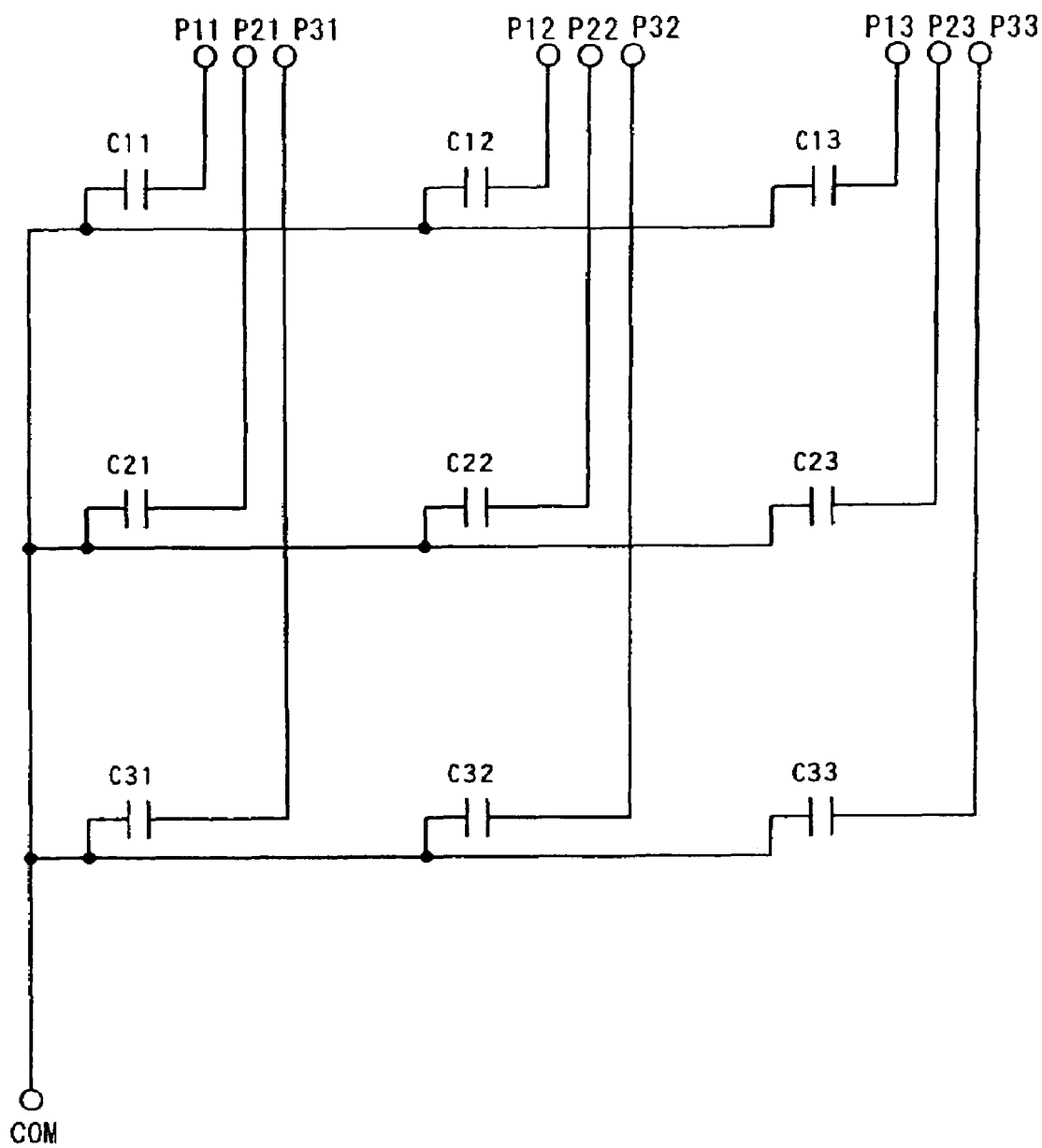
FIG. 14 is an electrical circuit diagram illustrating an optical switch array of an optical switch system of a comparative example.

FIG. 14 is an electrical circuit diagram illustrating an optical switch array of an optical switch system in Comparative Example 1. In FIG. 14, the same or corresponding parts to those shown in FIG. 12 are given the same reference numerals, and the same descriptions will not be repeated. As shown in FIG. 14, Comparative Example 1 differs from the first embodiment in that, in accordance with the related common electrode/individual electrode external connection method, fixed electrodes of all microactuators 111 are electrically connected in common on a substrate 121 and defined as common electrodes, and a terminal COM is connected to the common electrodes; and movable electrodes of the microactuators 111 are used as individual electrodes without electrically connecting them, and connected to respective terminals P11, P12, P13, P21, P22, P23, P31, P32, and P33. Accordingly, in Comparative Example 1, an external control circuit 6 controls the electrical potentials of the terminals P11, P12, P13, P21, P22, P23, P31, P32, and P33, which are set with reference to the electrical potential of the terminal COM, in order to set the voltages between the electrodes of capacitors C11, C12, C13, C21, C22, C23, C31, C32, and C33 at a predetermined voltage greater than clamp voltage Vc or at 0. Structural features of Comparative Example 1 other than those mentioned above are the same as those of the first embodiment.

In both the first embodiment and Comparative Example 1, only terminals are formed at the microactuators 111 of the optical switch array, so that an address circuit, a selecting switch (circuit), etc., are not formed. As can be seen from a comparison between FIGS. 14 and 12, 10 external connection terminals are required in Comparative Example 1, whereas only six connection terminals are required in the embodiment, so that the number of terminals is considerably reduced.

Figure 15:
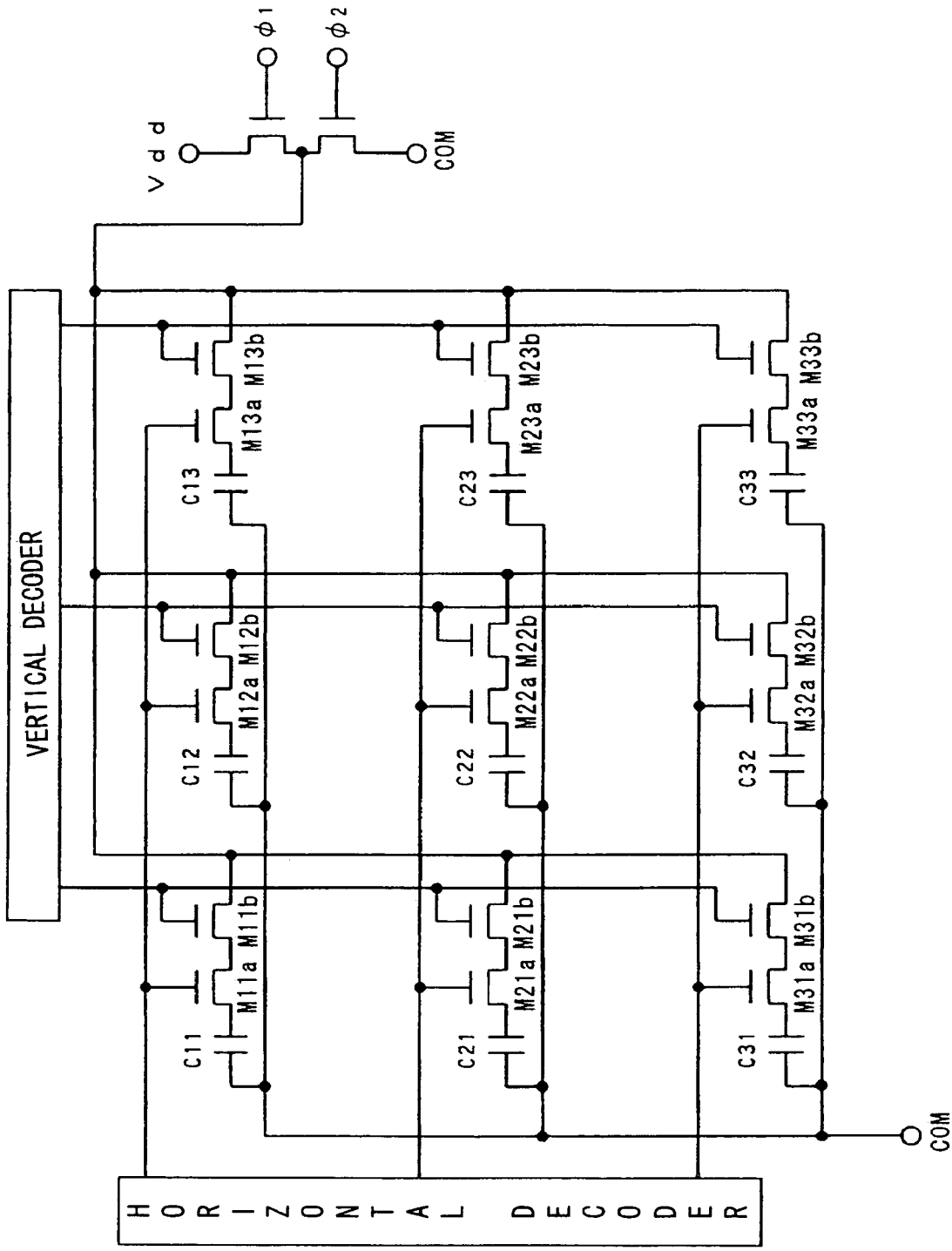
FIG. 15 is an electrical circuit diagram illustrating an optical switch array of an optical switch system of another comparative example.

FIG. 15 is an electrical circuit diagram illustrating an optical switch array of an optical switch system in Comparative Example 2. In FIG. 15, the same or corresponding parts to those shown in FIG. 12 are given the same reference numerals, and the same descriptions will not be repeated. As shown in FIG. 15, Comparative Example 2 differs from the first embodiment in that selecting switches M11a, M11b, M12a, M12b, M13a, M13b, M21a, M21b, M22a, M22b, M23a, M23b, M31a, M31b, M32a, M32b, M33a, and M33b, and a vertical decoder and a horizontal decoder are disposed on a substrate 121 in accordance with the related address circuit mounting method. The selecting switches and decoders are disposed as selecting switches and address circuits for selecting optical switches. Accordingly, in Comparative Example 2, an external control circuit 6 is not used, and an optical path switchover state command signal is supplied to the vertical decoder and the horizontal decoder through terminals (not shown). In addition, terminals COM to which fixed electrodes of all microactuators 111 are connected in common and a terminal Vdd for applying a source voltage between the terminals COM are mounted to the substrate 121. Structural features of Comparative Example 2 other than those mentioned above are the same as those of the first embodiment.

In Comparative Example 2, only a few terminals are required. However, a address circuit, a selecting switch, etc., formed using, for example, CMOS are mounted to the substrate 121, thereby, for example, (1) increasing the size of each actuator because, for example, highly pressure-resistant MOS having a larger planar size than an ordinary MOS must inevitably be used, (2) increasing costs because the number of steps of an optical switch array production process is increased by a MOS production step, and (3) increasing costs due to the addition of a smoothening step, which is carried out because, if smoothening is not sufficiently carried out after producing MOS, the shape of a base is transferred to the shape of MEMS to be formed on the MOS, resulting in malfunctioning. In particular, selecting switches are required on the substrate 121. In contrast, such problems do not occur in the first embodiment because an address circuit, a selecting switch, etc., are not mounted on the substrate in the optical switch array.

Accordingly, in the embodiment, the number of external connection terminals (that is, the number of wires which are externally connected) can be reduced because an address circuit, a selecting switch, etc. are not mounted. In particular, it is not necessary to dispose a selecting switch circuit on the substrate 121.

[Second Embodiment]

Figure 16:
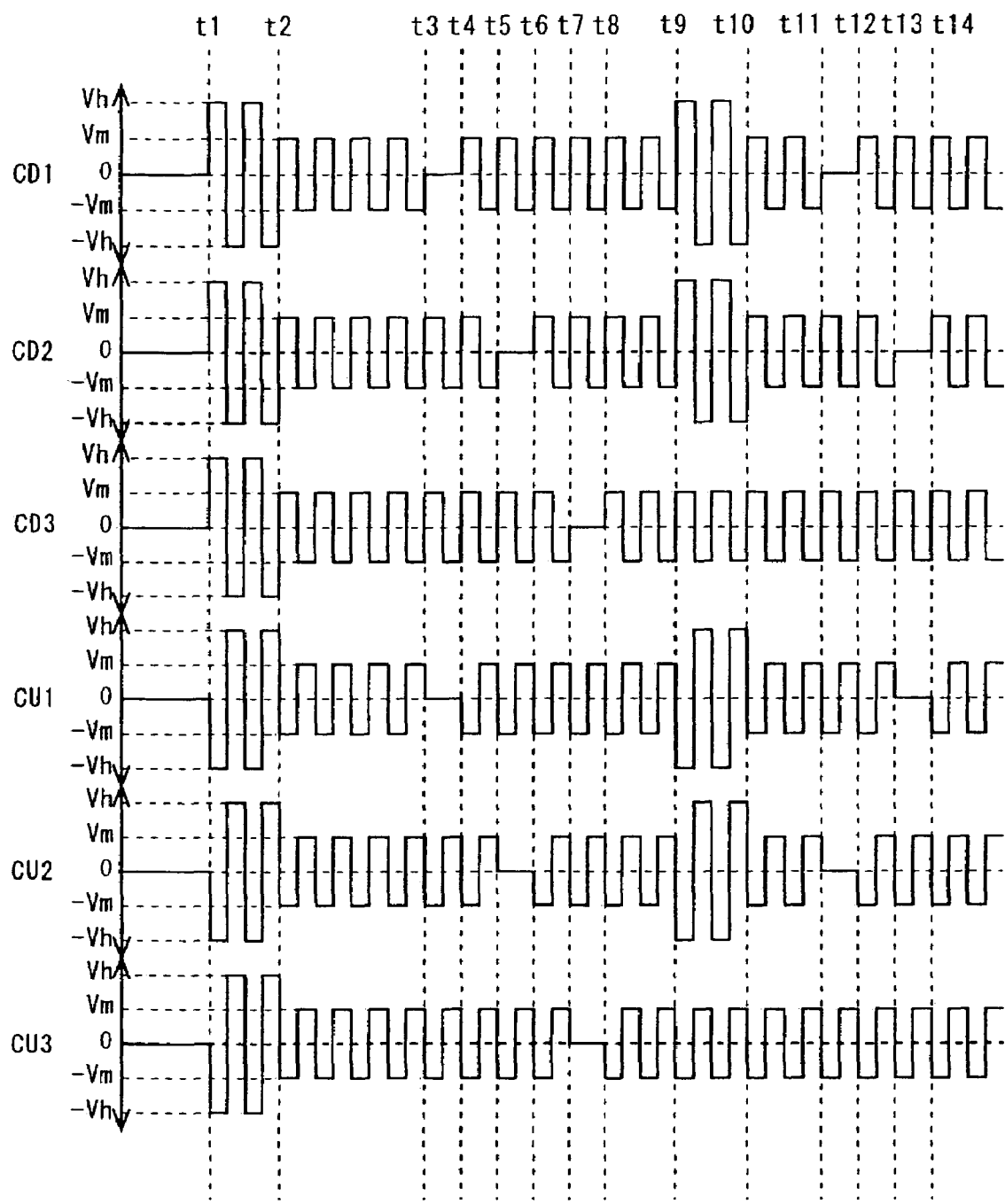
FIG. 16 is a timing chart of electrical potentials which an external control circuit applies to terminals in an optical switch system in a second embodiment of the present invention.

FIG. 16 is a timing chart of electrical potentials which an external control circuit 6 applies to terminals CD1 to CD3 and CU1 to CU3 in an optical switch system in a second embodiment of the present invention, and corresponds to FIG. 13.

This embodiment only differs from the first embodiment in that, whereas in the first embodiment, as shown in FIG. 13, the external control circuit 6 is constructed so that it applies electrical potentials that do not change with time to the terminals CD1 to CD3 and CU1 to CU3 in each period, in the second embodiment, as shown in FIG. 16, an external control circuit 6 is constructed so that it applies electrical potentials which vary in the form of pulses with time to the terminals CD1 to CD3 and CU1 to CU3 in each period. The electrical potentials applied to the terminals CD1 to CD3 and those applied to the terminals CU1 to CU3 have opposite phases in each period. In FIG. 16, the amplitudes of the electrical potentials applied to the terminals CD1 to CD3 and CU1 to CU3 in each period are equivalent to the absolute values of the electrical potentials applied to the terminals CD1 to CD3 and CU1 to CU3 in each period in FIG. 13. Therefore, even when electrical potentials are supplied as shown in FIG. 16, the same operations as those carried out when electrical potentials are supplied as shown in FIG. 13 are achieved.

In addition to the advantages of the first embodiment, the second embodiment provides the advantage that it is possible to prevent charging of each actuator 111.

Although, in the embodiment, electrical potentials which change in the form of pulses with time are applied to the terminals CD1 to CD3 and CU1 to CU3 in each period, it is possible to apply electrical potentials which change sinusoidally with time to the terminals CD1 to CD3 and CU1 to CU3 in each period. Even in this case, the same advantages as those of the embodiment are obtained.

[Third Embodiment]

Figure 17:
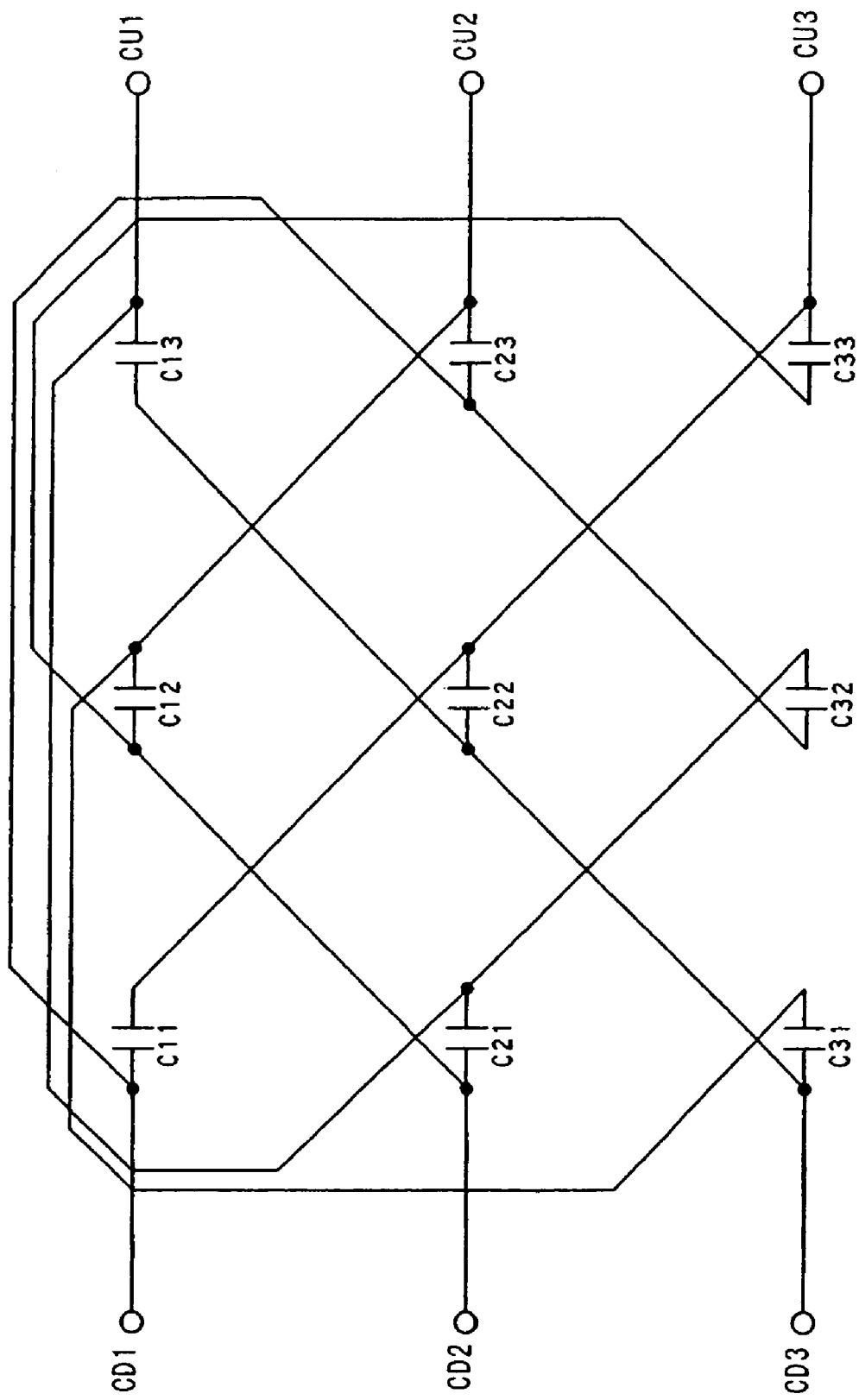
FIG. 17 is an electrical circuit diagram illustrating an optical switch array of an optical switch system in a third embodiment of the present invention.
Figure 18:
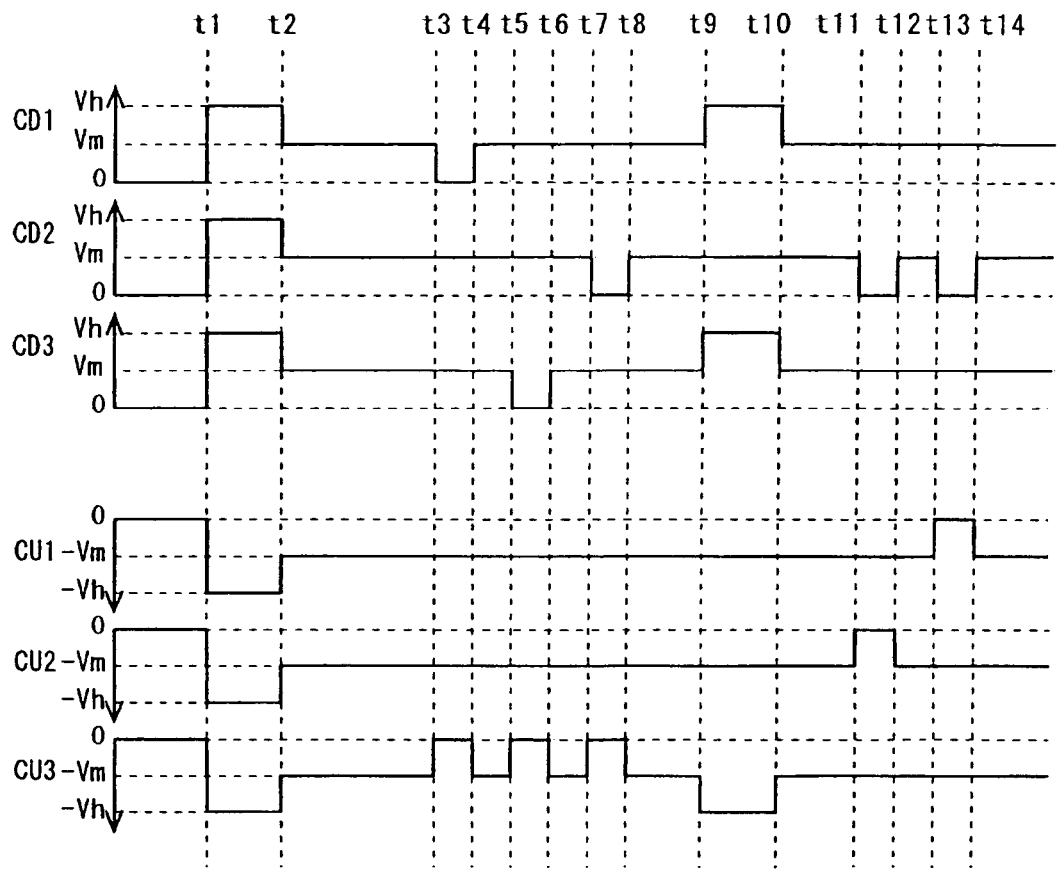
FIG. 18 is a timing chart of electrical potentials which an external control circuit applies to terminals in the optical switch system in the third embodiment of the present invention.

FIG. 17 is an electrical circuit diagram illustrating an optical switch array of an optical switch system in a third embodiment of the present invention. FIG. 18 is a timing chart of electrical potentials which an external control circuit 6 applies to terminals CD1 to CD3 and CU1 to CU3 in the optical switch system in the third embodiment of the present invention, and corresponds to FIG. 13.

This embodiment only differs from the first embodiment in electrical connection relationships between microactuators 111 and the terminals CD1 to CD3 and CU1 to CU3 on a substrate 121 of the optical system array, and states of application of electrical potentials to the terminals CD1 to CD3 and CU1 to CU3 by the external control circuit 6.

In this embodiment, fixed electrodes 128 of capacitors C11, C23, and C32 are connected in common to the terminal CD1, fixed electrodes 128 of capacitors C21, C12, and C33 are connected in common to the terminal CD2, and fixed electrodes 128 of capacitors C31, C22, and C13 are connected in common to the terminal CD3. Movable electrodes of the capacitors C13, C21, and C32 are connected in common to the terminal CU1, movable electrodes of the capacitors C23, C12, and C31 are connected in common to the terminal CU2, and movable electrodes of the capacitors C33, C22, and C11 are connected in common to the terminal CU3. Even if the capacitors and terminals are electrically connected in such relationships, the Conditions (a) to (e) given in the first embodiment are satisfied.

In the embodiment, since the capacitors and terminals are electrically connected in such relationships, the external control circuit 6 is constructed so as to apply electrical potentials to the terminals CD1 to CD3 and CU1 to CU3 as shown in FIG. 18. FIG. 18 shows an example of a timing chart for achieving the same operations as those achieved based on FIG. 13 in each period.

This embodiment provides the same advantages as those of the first embodiment. In the present invention, the third embodiment may be modified in the same way as the first embodiment is modified to achieve the second embodiment.

[Fourth Embodiment]

Figure 19:
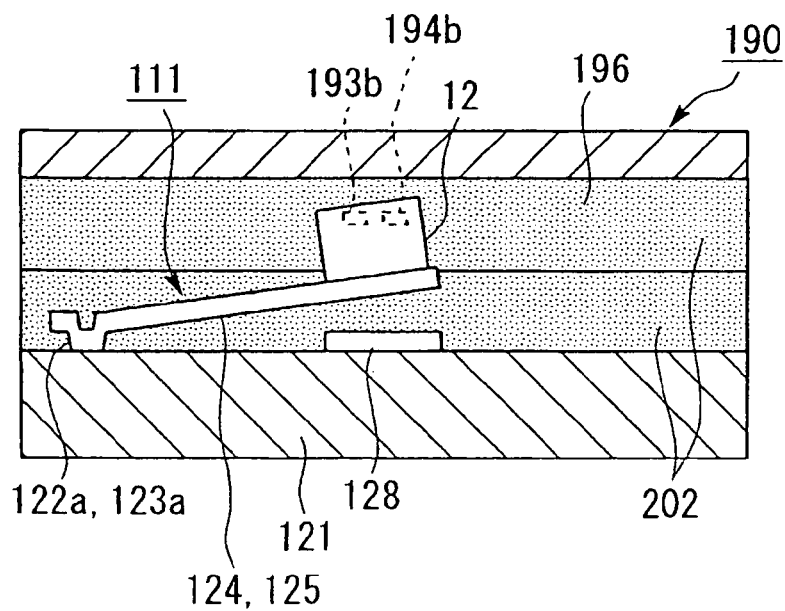
FIG. 19 is a schematic sectional view of the main portion of an optical switch system in a fourth embodiment of the present invention, with a mirror being held at an upper side.
Figure 20:
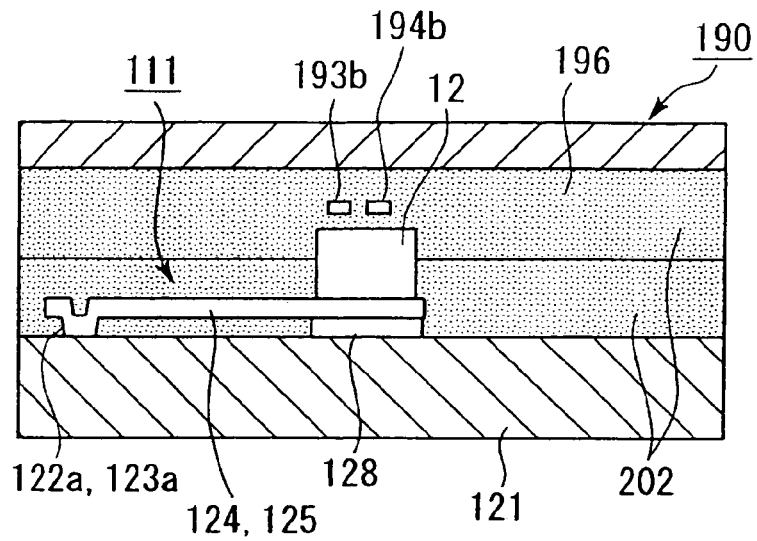
FIG. 20 is a schematic sectional view of the main portion of the optical switch system in the fourth embodiment of the present invention, with the mirror being held at a lower side.
Figure 21:
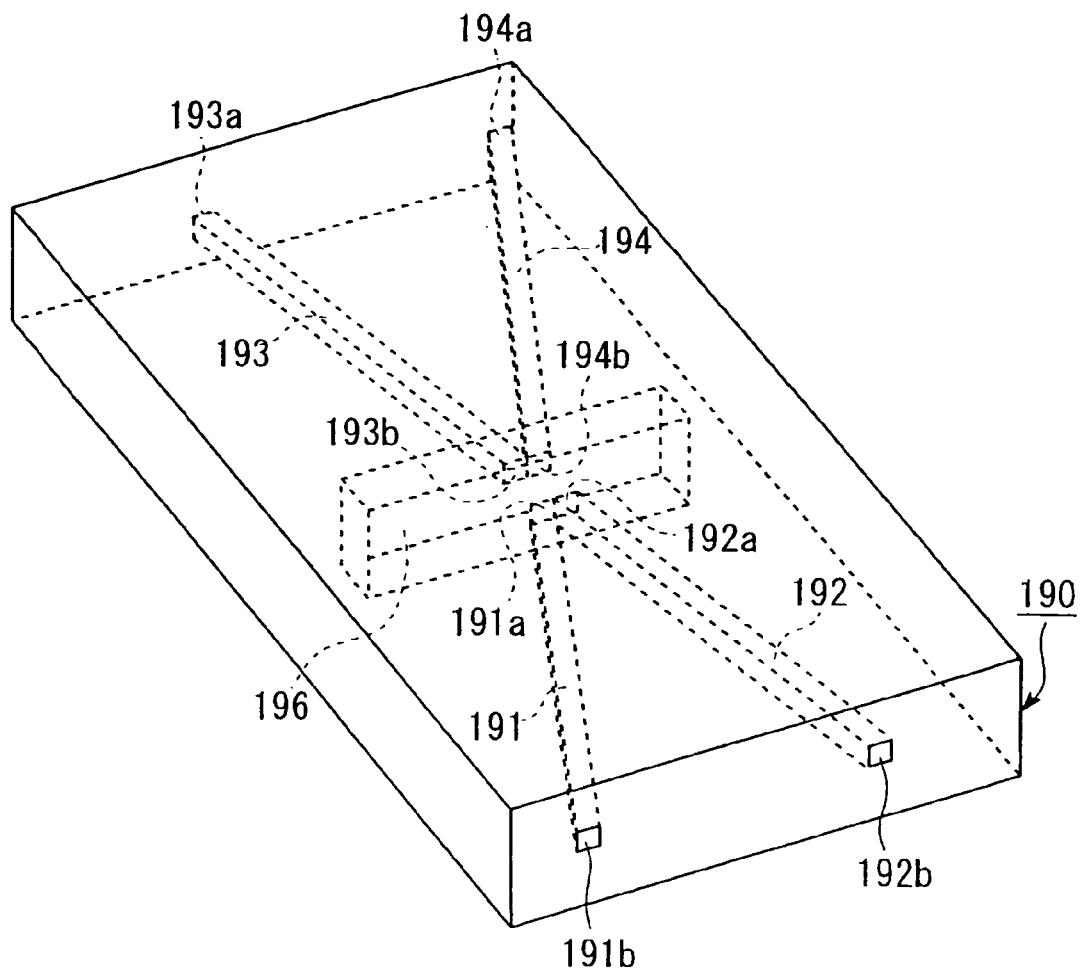
FIG. 21 is a schematic perspective view of a portion of an optical waveguide substrate in FIGS. 19 and 20.

FIGS. 19 and 20 are each schematic sectional views of the main portion of an optical switch system in a fourth embodiment of the present invention. FIG. 19 shows a state in which a mirror 12 is held at an upper side and moved in an optical path. FIG. 20 shows a state in which the mirror 12 is held at a lower side and moved away from the optical path. In FIGS. 19 and 20, the structure of a microactuator 111 is shown considerably simplified. FIG. 21 is a schematic perspective view of a portion of an optical waveguide substrate 190 in FIGS. 19 and 20.

This embodiment differs from the first embodiment only in that the optical waveguide substrate 190 is disposed as shown in FIGS. 19 and 20.

In the embodiment, as shown in FIG. 21, the optical waveguide substrate 190 has four optical waveguides 191 to 194 for transmitting light and to be switched. The optical waveguide substrate 190 has a groove 196 having a width of, for example, about tens of micrometers in the central portion, with end surfaces 191a, 192a, 193b, and 194b of the respective optical waveguides 191 to 194 being exposed at side surfaces defining the groove 196. As shown in FIGS. 19 and 20, the distance between the end surfaces 191a and 192a and the distance between the end surfaces 193b and 194b are set so that they can be covered by a reflective surface of the mirror 12.

As shown in FIGS. 19 and 20, the optical waveguide substrate 190 is disposed above a substrate 121 of the microactuator 111 and a refractive index matching liquid 202 is sealed in a space between the waveguide substrate 190 and the substrate 121 and a space in the groove 196 which communicates with the space between the waveguide substrate 190 and the substrate 121. It stands to reason that, although it is not necessary to seal in the refractive index matching liquid 202, light beam loss is smaller when the refractive index matching liquid is used. The substrate 121 and the optical waveguide substrate 190 are aligned so as to allow insertion of the mirror 12 into the groove 196.

Although, in FIGS. 19 to 21, the optical waveguides in the optical waveguide substrate 190 are shown as intersecting at one point, the optical waveguides in the optical waveguide substrate 190 are formed two-dimensionally in a matrix, so that intersection points of the optical waveguides are disposed two-dimensionally in a matrix. In accordance with this, a plurality of the microactuators 111 are two-dimensionally disposed on the substrate 121, so that mirrors 12 at the respective intersection points of the optical waveguides are constructed so as to be driven by their respective microactuators 111.

By the aforementioned controlling operation, when, as shown in FIG. 20, the mirror 12 is disposed below the end surfaces 193b and 194b of the respective optical waveguides 193 and 194, and when, for example, light is incident upon the optical waveguide 193 from the end surface 193a, the light propagates through the optical waveguide 193, exits from the end surface 193b, impinges upon the opposing end surface 192a of the optical waveguide 192 as it is, propagates through the optical waveguide 192, and exits from the end surface 192b. If, for example, light is incident upon the optical waveguide 191 from the end surface 191b, the light propagates through the optical waveguide 191, exists from the end surface 191a, impinges upon the opposing end surface 194b of the optical waveguide 194 as it is, propagates through the optical waveguide 194, and exits from the end surface 194a.

In contrast, by the aforementioned controlling operation, when, as shown in FIG. 19, the mirror 12 is positioned so as to cover the end surfaces 193b and 194b of the respective optical waveguides 193 and 194, and, when, for example, light is incident upon the optical waveguide 193 from the end surface 193a, the light propagates through the optical waveguide 193, exits from the end surface 193b, is reflected by the mirror 12, impinges upon the end surface 194b of the optical waveguide 194, propagates through the optical waveguide 194, and exits from the end surface 194a. If, for example, light is incident upon the optical waveguide 191 from the end surface 191b, the light propagates through the optical waveguide 191, exits from the end surface 191a, is reflected by the mirror 12, impinges upon the end surface 192a of the optical waveguide 192, propagates through the optical waveguide 192, and exits from the end surface 192b.

This embodiment provides the same advantages as those of the first embodiment. In the present invention, the second and third embodiments may be modified as the first embodiment is modified to achieve the fourth embodiment.

[Fifth Embodiment]

Figure 22:
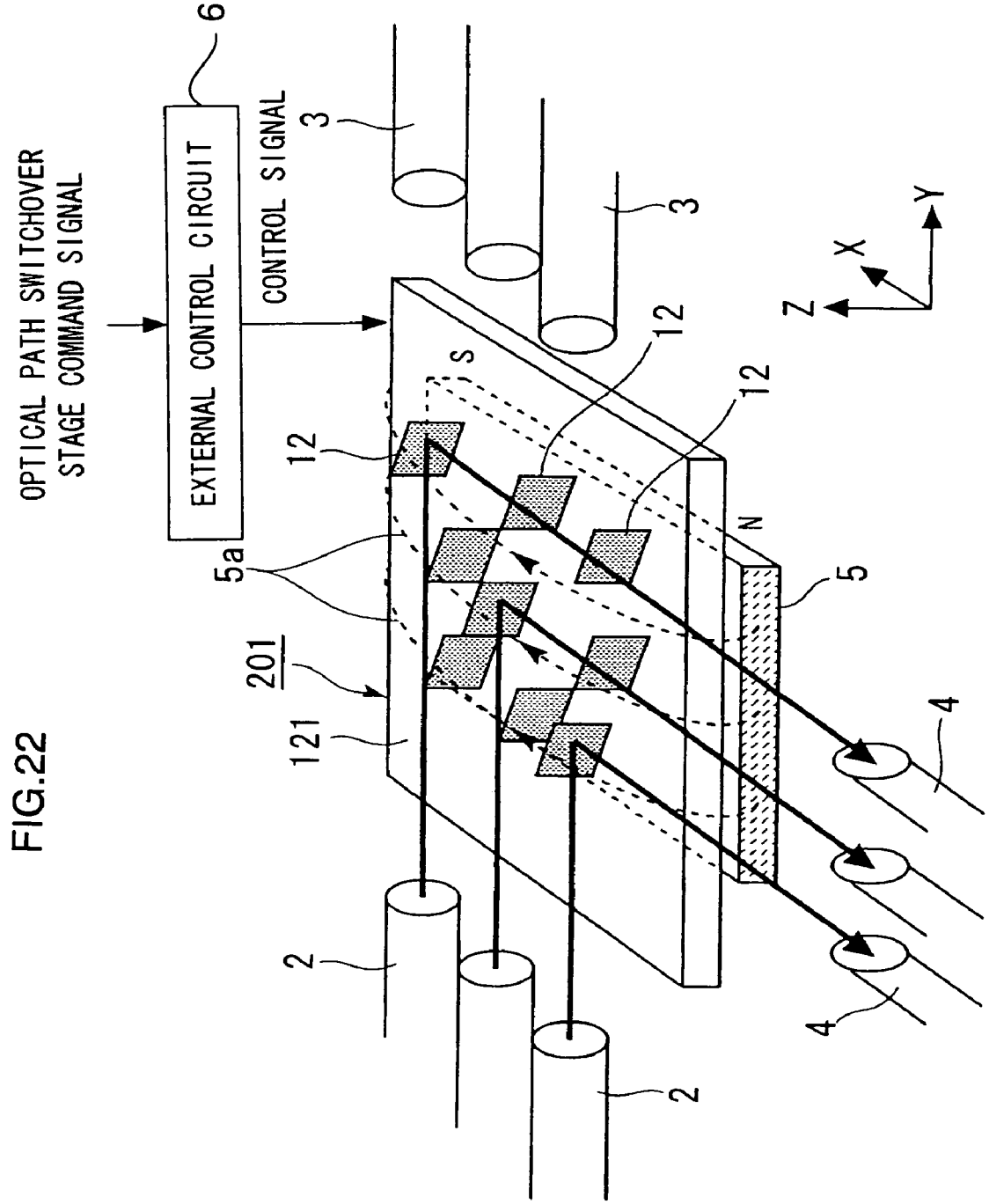
FIG. 22 is a schematic structural view of an optical switch system comprising an optical switch array in a fifth embodiment of the present invention.

FIG. 22 is a schematic structural view of an optical switch system comprising an optical switch array 201 in a fifth embodiment of the present invention. In FIG. 22, the same or corresponding parts to those shown in FIG. 1 are given the same reference numerals, and the same descriptions will not be repeated.

This embodiment only differs from the first embodiment in that the optical switch array 201 is used instead of the optical switch array 1; a magnetic 5 is additionally used as a magnetic field generating section for generating a magnetic field at the optical switch array 201 as described later; and an external control circuit 6 operates differently.

In the embodiment, as shown in FIG. 22, the magnet 5 is a plate-shaped permanent magnet having its −X side magnetized as an N pole and its +X side magnetized as an S pole, and is disposed below the optical switch array 201 in order to generate a magnetic field indicated by magnetic force lines 5a at the optical switch array 201. In other words, the magnet 5 generates a substantially uniform magnetic field towards the +X side with respect to the optical switch array 201. Obviously, instead of the magnet 5, for example, a permanent magnet with a different shape or an electromagnet may be used as the magnetic field generating section.

The optical switch array 201 only differs from the optical switch array 1 in that, instead of the optical switch shown in FIGS. 2 to 9, an optical switch shown in FIGS. 23 to 30 is used as an optical switch which is a unit element. The optical switch shown in FIGS. 23 to 30 only differs from the optical switch shown in FIGS. 2 to 9 in that a microactuator 211 is used instead of the microactuator 111.

Figure 23:
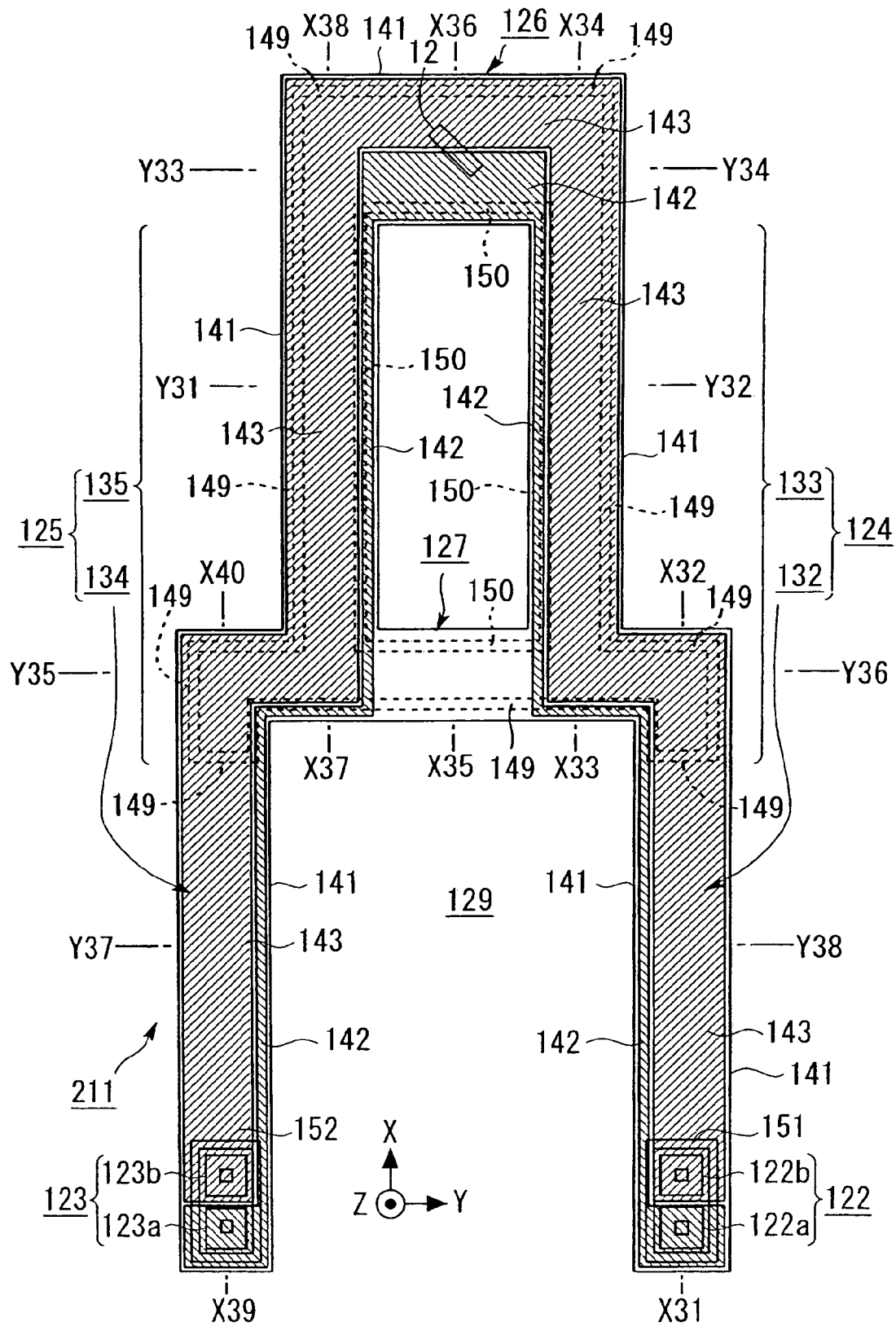
FIG. 23 is a schematic plan view of one optical switch which is a unit element in the optical switch array used in the optical switch system in the fifth embodiment of the present invention.
Figure 24:
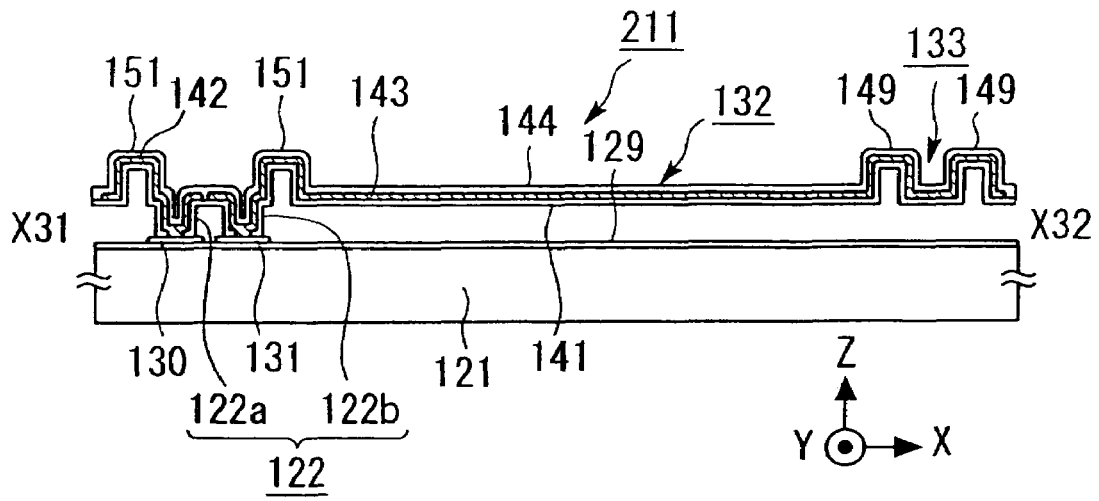
FIG. 24 is a schematic sectional view taken along line X31–X32 in FIG. 23.
Figure 25:
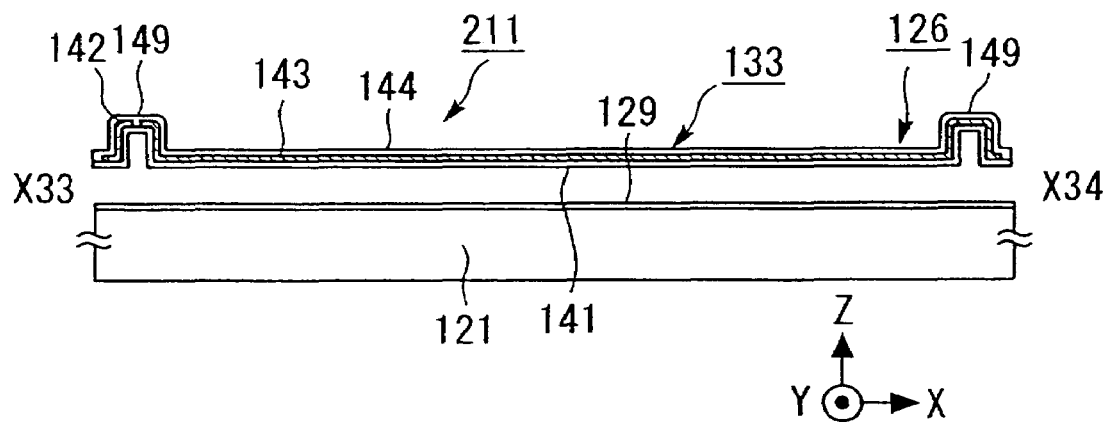
FIG. 25 is a schematic sectional view taken along line X33–X34 in FIG. 23.
Figure 26:
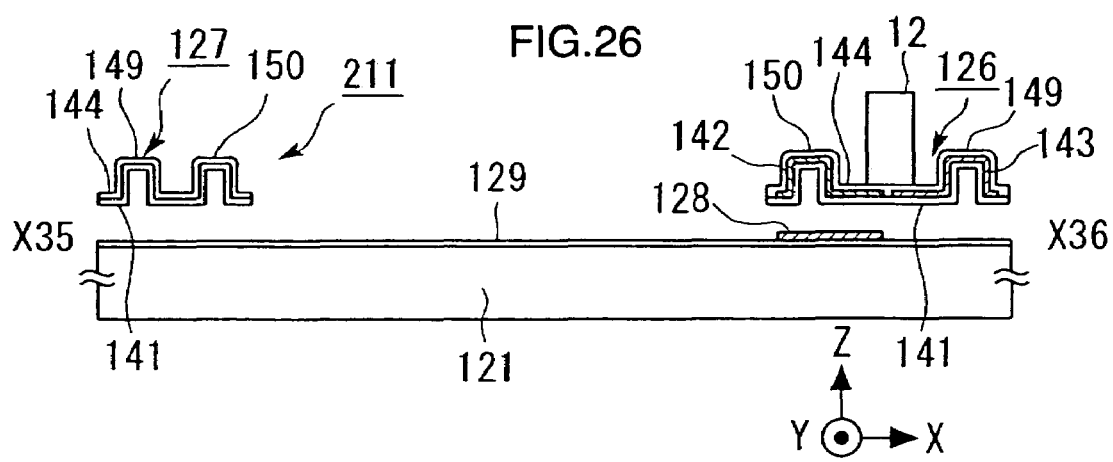
FIG. 26 is a schematic sectional view taken along line X35–X36 in FIG. 23.
Figure 27:
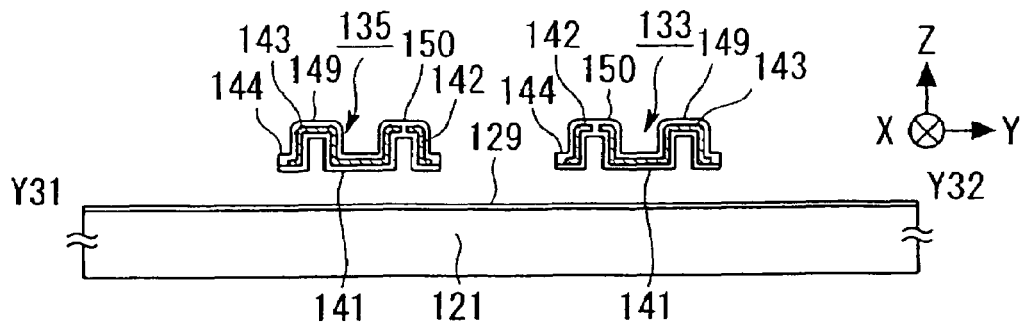
FIG. 27 is a schematic sectional view taken along line Y31–Y32 in FIG. 23.
Figure 28:
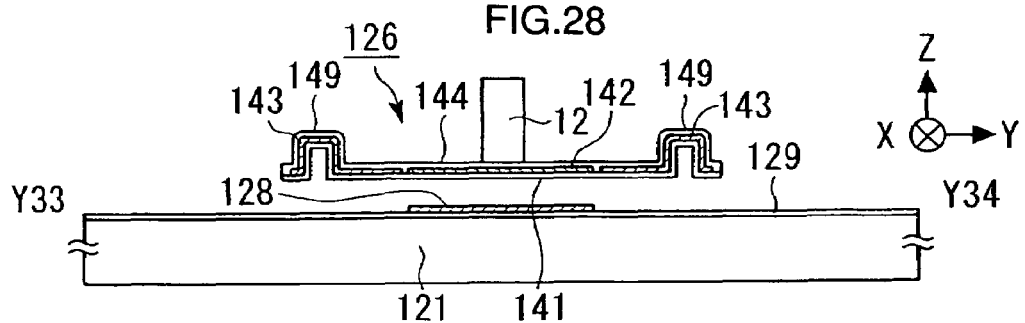
FIG. 28 is a schematic sectional view taken along line Y33–Y34 in FIG. 23.
Figure 29:
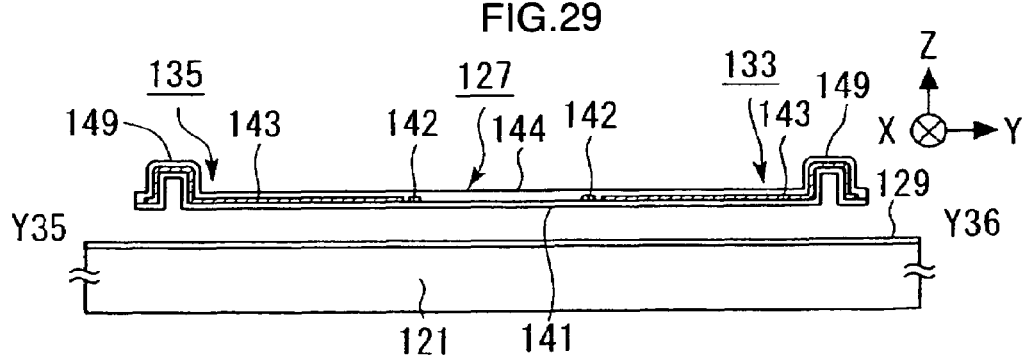
FIG. 29 is a schematic sectional view taken along line Y35–Y36 in FIG. 23.
Figure 30:
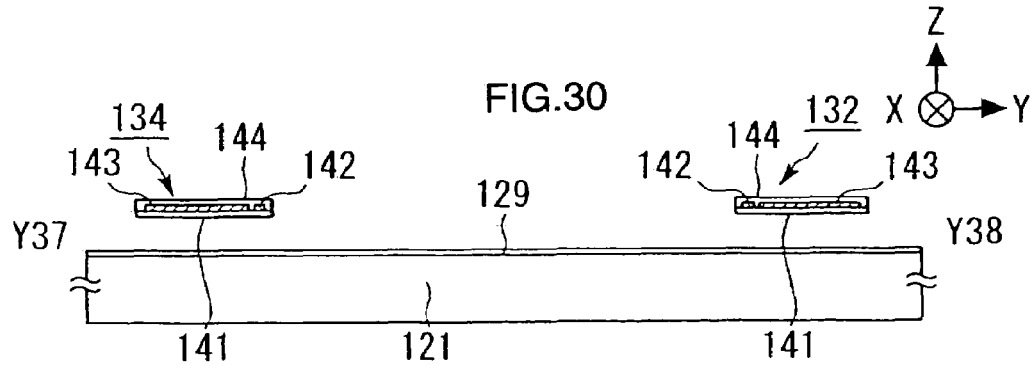
FIG. 30 is a schematic sectional view taken along line Y37–Y38 in FIG. 23.

FIG. 23 is a schematic plan view of one optical switch (that is, one microactuator 211 and one mirror 12 driven by the microactuator 211) which is a unit element in the optical switch array used in the optical switch system in the fifth embodiment of the present invention. In FIG. 23, an SiN film 144 serving as a protective film formed over the entire surface of a movable section and legs is not shown, protruding bars 149 and 150, which should actually be drawn with solid lines, are drawn with broken lines, and Al films 142 and 143 are hatched. FIG. 24 is a schematic sectional view taken along line X31–X32 in FIG. 23. Although not drawn as a figure, the schematic sectional view taken along line X39–X40 in FIG. 23 is similar to FIG. 24. FIG. 25 is a schematic sectional view taken along line X33–X34 in FIG. 23. Although not drawn as a figure, the schematic sectional view taken along line X37–X38 in FIG. 23 is similar to FIG. 25. FIG. 26 is a schematic sectional view taken along line X35–X36 in FIG. 23. FIG. 27 is a schematic sectional view taken along line Y31–Y32 in FIG. 23. FIG. 28 is a schematic sectional view taken along line Y33–Y34 in FIG. 23. FIG. 29 is a schematic sectional view taken along line Y35–Y36 in FIG. 23. FIG. 30 is a schematic sectional view taken along line Y37–Y38 in FIG. 23. Although, in FIGS. 24 to 30, beam structures 132 and 134 are shown as not being bent in a Z axis direction, when a force is not applied to the movable section, the beam structures 132 and 134 are actually bent in the +Z direction by stress of films of the beam structures 132 and 134. In FIGS. 23 to 30, the same or corresponding parts to those shown in FIGS. 2 to 9 are given the same reference numerals, and the same descriptions will not be repeated.

Basically, the microactuator 211 shown in FIGS. 23 to 30 only differs from the microactuator 111 shown in FIGS. 2 to 9 in that, whereas the microactuator 111 in the first embodiment only makes use electrostatic force, the microactuator 211 in the embodiment makes use of not only electrostatic force but also Lorentz force.

In the microactuator 211, a fixed end (−X direction end) of a beam section 124 is mechanically connected to a substrate 121 through a leg 122 comprising two individual leg portions 122a and 122b having upstanding portions from the substrate 121 through respective wiring patterns 130 and 131 (not shown in FIG. 23) formed of Al films formed on an insulating film 129, such as a silicon oxide film, on the substrate 121. Similarly, a fixed end (−X direction end) of a beam section 125 is mechanically connected to the substrate 121 through a leg 123 comprising two individual leg portions 123a and 123b having upstanding portions from the substrate 121 through two respective wiring patterns (not shown) formed of Al films formed on the insulating film 129 on the substrate 121.

The beam structure 132 is a thin film of three laminated layers of a lower SiN film 141, intermediate Al films 142 and 143, and an upper protective SiN film 144 (there are two layers in a gap between the Al films 142 and 143), and functions as a plate spring. The Al films 142 and 143 are formed in the same layer, and are, as shown in FIG. 23, formed with a slight gap therebetween in a Y axis direction and electrically isolated from each other. This is because the Al film 142 is used as a wire to a movable electrode for electrostatic force, and the Al film 143 is used as a wire for forming a current path for Lorentz force. Almost no electric current flows through the wire for electrostatic force, whereas a relatively large amount of current flows through the wire for Lorentz force. Therefore, in order to reduce electrical resistance of the wire for Lorentz force, the Al film 142 is formed with a small width, and the Al film 143 is formed with a large width.

The beam structure 133 is a thin film of three laminated layers comprising a lower SiN film 141, intermediate Al films 142 and 143, and an upper protective SiN film 144, which extend continuously from the beam structure 132 (there are two layers in a gap between the Al films 142 and 143).

In the embodiment, the leg 122 is formed by continuously extending the SiN films 141 and 144 and the Al films 142 and 143 forming the beam structure 132 as they are, and comprise the two individual leg portions 122a and 122b. The leg 122 comprises the two individual leg portions 122a and 122b in order to separate the wire for electrostatic force and the wire for Lorentz force and electrically connect the Al film 142 and the Al film 143 to the separate wiring patterns 130 and 131 on the substrate 121. The Al film 142 is electrically connected to the wiring pattern 130 through an opening formed in the SiN film 141 at the individual leg portion 122a. The Al film 143 is electrically connected to the wiring pattern 131 through an opening formed in the SiN film 141 at the individual leg portion 122b. In order to make the leg 122 stronger, a protruding rod 151 is formed with a square shape at the top portion of the leg 122 so as to surround the individual leg portions 122a and 122b in plan view as seen from a Z axis direction.

The beam section 125 and the leg 123 have exactly the same structures as the above-described beam section 124 and the leg 124, respectively. The beam structure 134 and a beam structure 135 of the beam section 125 correspond to the beam structures 132 and 133 of the beam section 124, respectively. The individual leg portions 123a and 123b of the leg 123 correspond to the individual leg portions 122a and 122b of the leg 122. A protruding rod 152 corresponding to the protruding rod 151 is formed at the top portion of the leg 123.

A connecting section 127 comprises the two SiN films 141 and 144 extending continuously from the beam structures 133 and 135. The Al films 142 and 143 do not extend to the connecting section 127 from the beam structures 133 and 135. Therefore, the connecting section 127 is not electrically connected at all.

A connecting section 126 is formed by continuously extending the SiN films 141 and 144 and the Al films 142 and 143 forming the beam structures 133 and 135 as they are. A mirror 12 serving as a member to be driven and formed of a metal such as Au or Ni are disposed at the connecting section 126.

As shown in FIG. 23, in the connecting section 126, the Al film 142 and the Al film 143 are separated from each other, and a portion of the Al film 142 at the connecting section 126 serves as a movable electrode for electrostatic force. A fixed electrode 128 for electrostatic force, formed of an Al film, is disposed on an area of the substrate 121 opposing the movable electrode. Although not shown, the Al film of the fixed electrode 128 extends as a wiring pattern. By using this wiring pattern along with the wiring pattern 130, a voltage (electrostatic voltage) can be applied between the fixed electrode 128 and the portion of the Al film 142 at the connecting section 126, serving as the movable electrode.

As can be understood from the foregoing description, the Al film 143 forms an electrical current path extending as follows from the wiring pattern 131 below the individual leg portion 122b of the leg 122: the beam structure 132→ the beam structure 133→ the connecting section 126→ the beam structure 135→ the beam structure 134→ the wiring pattern (not shown) below the individual leg portion 123b of the leg 123. When a portion of the electrical current path along a Y axis direction at the connecting section 126 among the portions of the electrical current path is placed in a magnetic field extending in an X axis direction, the portion is a portion for generating Lorentz force in a Z axis direction. Therefore, when the portion is placed in a magnetic field in an X axis direction using the permanent magnet 5 shown in FIG. 22, and an electrical current (for Lorentz force) is passed through the electrical current path, a Lorentz force (driving force) acts in a Z direction at the portion of the Al film 143 at the connecting section 126. The direction of the Lorentz force is either in the +Z direction or the −Z direction depending upon the direction of the electrical current for Lorentz force.

Therefore, in the embodiment, by controlling the voltage between the electrodes and the electrical current for Lorentz force, it is possible to hold the mirrors 12 at an upper side (side opposite to the substrate 121) and at a lower side (side of the substrate 121). In the embodiment, as described later, such a controlling operation is carried out.

In the embodiment, a plurality of the optical switches each comprising a mirror 12 and a microactuator 211 for driving the mirror 12 are two-dimensionally disposed in a matrix on the substrate 121, and form an optical switch array.

Figure 31:
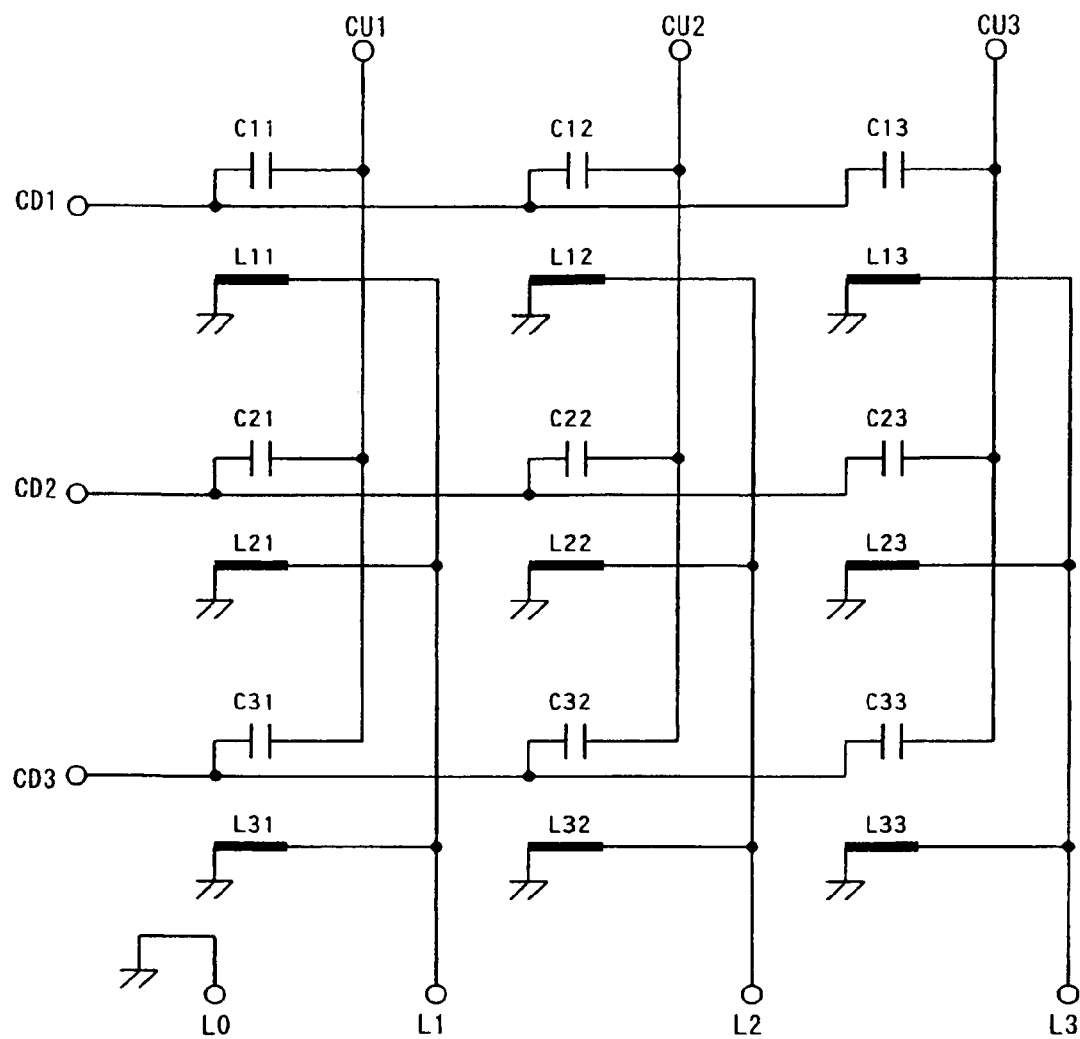
FIG. 31 is an electrical circuit diagram illustrating the optical switch array used in the fifth embodiment of the present invention.

FIG. 31 is an electrical circuit diagram illustrating the optical switch array used in the embodiment. In FIG. 31, the same or corresponding parts to those shown in FIG. 12 are given the same reference numerals, and the same description will not be repeated. The single optical switch shown in FIGS. 23 to 30 may be regarded as one capacitor (corresponding to a capacitor comprising the fixed electrode 128 and the movable electrode (portion of the Al film 142 at the connecting section 126)) and as one coil (portion of the Al film 143 at the connecting section 126) in terms of an electrical circuit. In FIG. 31, a capacitor of an m row and an n column and a coil of an m row and an n column of an optical switch is represented as Cmn and Lmn, respectively.

In the embodiment, coils Lmn are added, so that, as shown in FIG. 31, a third terminal group comprising a plurality of terminals L0 to L3 is added. One of the ends of each of coils L11, L21, and L31 in the first column is electrically connected to the terminal L1 of the third terminal group. One of the ends of each of coils L12, L22, and L32 in the second column is electrically connected to the terminal L2 of the third terminal group. One of the ends of each of coils L13, L23, and L33 in the third column is electrically connected to the terminal L3 of the third terminal group. The other ends of all of the coils are electrically connected in common to the terminal L0 of the third terminal group. In order to restrict the amount of electrical current flowing in the wiring patterns, for example, the other ends of the coils L11, L21, and L31 in the first column may be electrically connected in common to one terminal, the other ends of the coils L12, L22, and L32 in the second column may be electrically connected in common to another terminal, and the other ends of the coils L13, L23, and L33 in the third column may be electrically connected in common to still another terminal.

Figure 32:
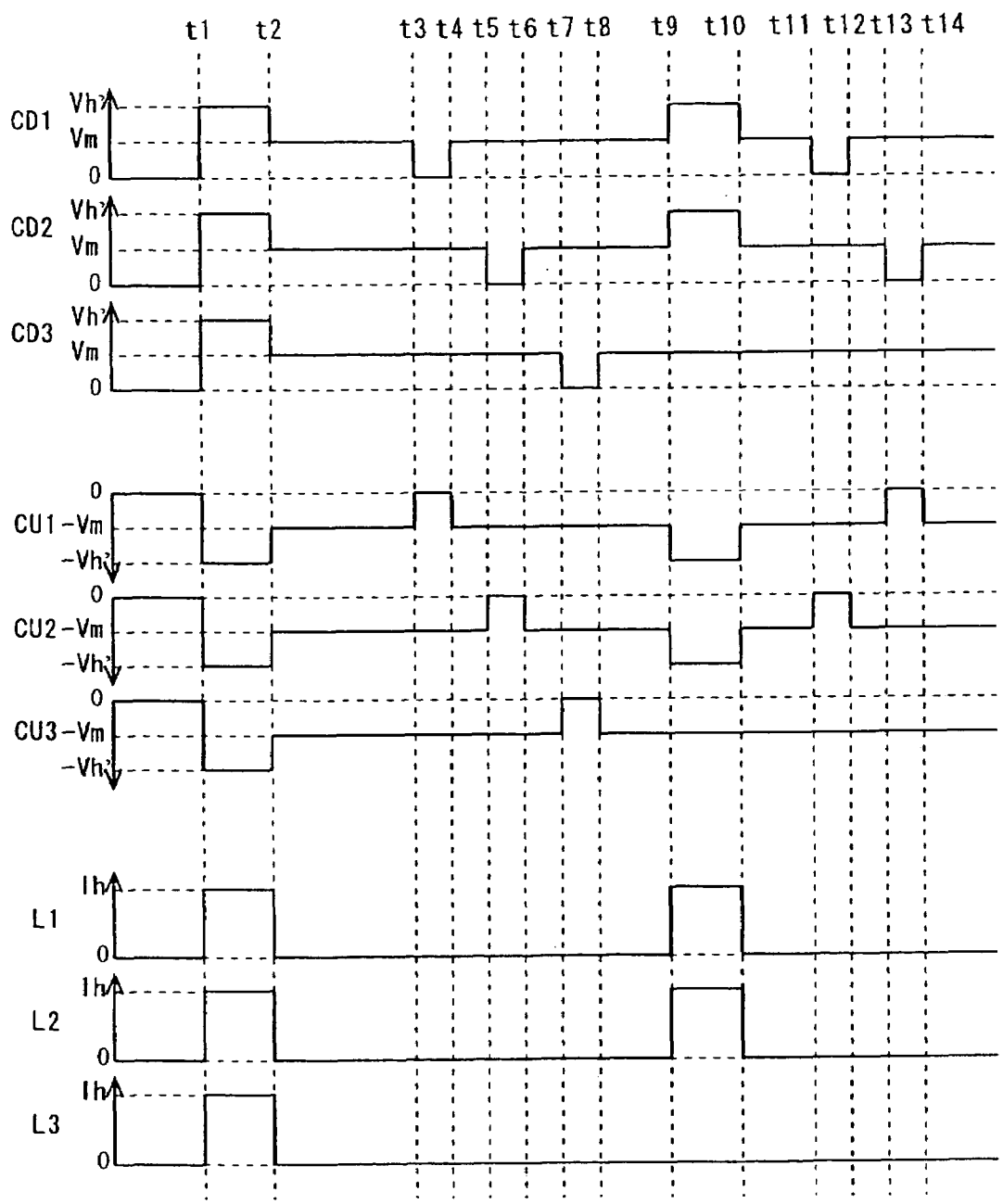
FIG. 32 is a timing chart of electrical potentials which an external control circuit applies to terminals and of currents which are passed through coils through terminals, in the optical switch system in the fifth embodiment of the present invention.

FIG. 32 is a timing chart of electrical potentials which an external control circuit 6 applies to terminals CD1 to CD3 and CU1 and CU3 and of currents which are passed through the coils through the respective terminals L1 to L3, in the optical switch system in the embodiment, and corresponds to FIG. 13.

FIG. 32 shows a timing chart for achieving the same operations as those achieved based on FIG. 13 in each period. In each period, the electrical potentials applied to the terminals CD1 to CD3 and CU1 to CU3 in FIG. 32 are basically the same as those in FIG. 13. However, the electrical potentials applied to the terminals CD1 to CD3 in a period t1 to t2 and a period t9 to t10 are Vh', which are positive values less than Vh, and the electrical potentials applied to the terminals CU1 to CU3 in the period t1 to t2 and the period t9 to t10 are −Vh'. A value equal to 2×Vh' does not necessarily have to be greater than Vcmax. In the period t1 to t2, current Ih flows through the terminals L1 to L3, and, in the period t9 to t10, the current Ih flows through the terminals L1 and L2. The current Ih is in a direction in which a downward Lorentz force is generated (that is, a direction in which a movable section moves to a clamp position).

In the first embodiment, as shown in FIG. 13, in the period t1 to t2 and the period t9 to t10, corresponding actuators 211 are maintained in a clamped state by electrostatic force alone after being clamped from an unclamped state. In contrast, in the embodiment, in the period t1 to t2 and the period t9 to t10, electrostatic force and Lorentz force can both be used. Since Lorentz force does not depend upon the distance between electrodes, in the embodiment, the clamping is maintained mainly by Lorentz force when a movable electrode starts moving. When the distance between a movable electrode and a fixed electrode 128 becomes smaller than a certain value, the electrostatic force is increased, thereby making it possible to maintain the clamped state by the electrostatic force alone. Therefore, at a time t2, even if the current is set at 0, the clamped state is maintained. In this way, when Lorentz force is used, the amount of electrostatic force is sufficient when it allows the clamped state to be maintained. Therefore, in the period t1 to t2 and the period t9 to t10, the voltage between the electrodes of a corresponding actuator 211 only needs to be equal to 2×Vh', which is less than 2×Vh in FIG. 13.

This embodiment provides the same advantages as those of the first embodiment. The fifth embodiment may be modified as the first embodiment is modified to achieve the second and fourth embodiments.

[Sixth Embodiment]

Figure 33:
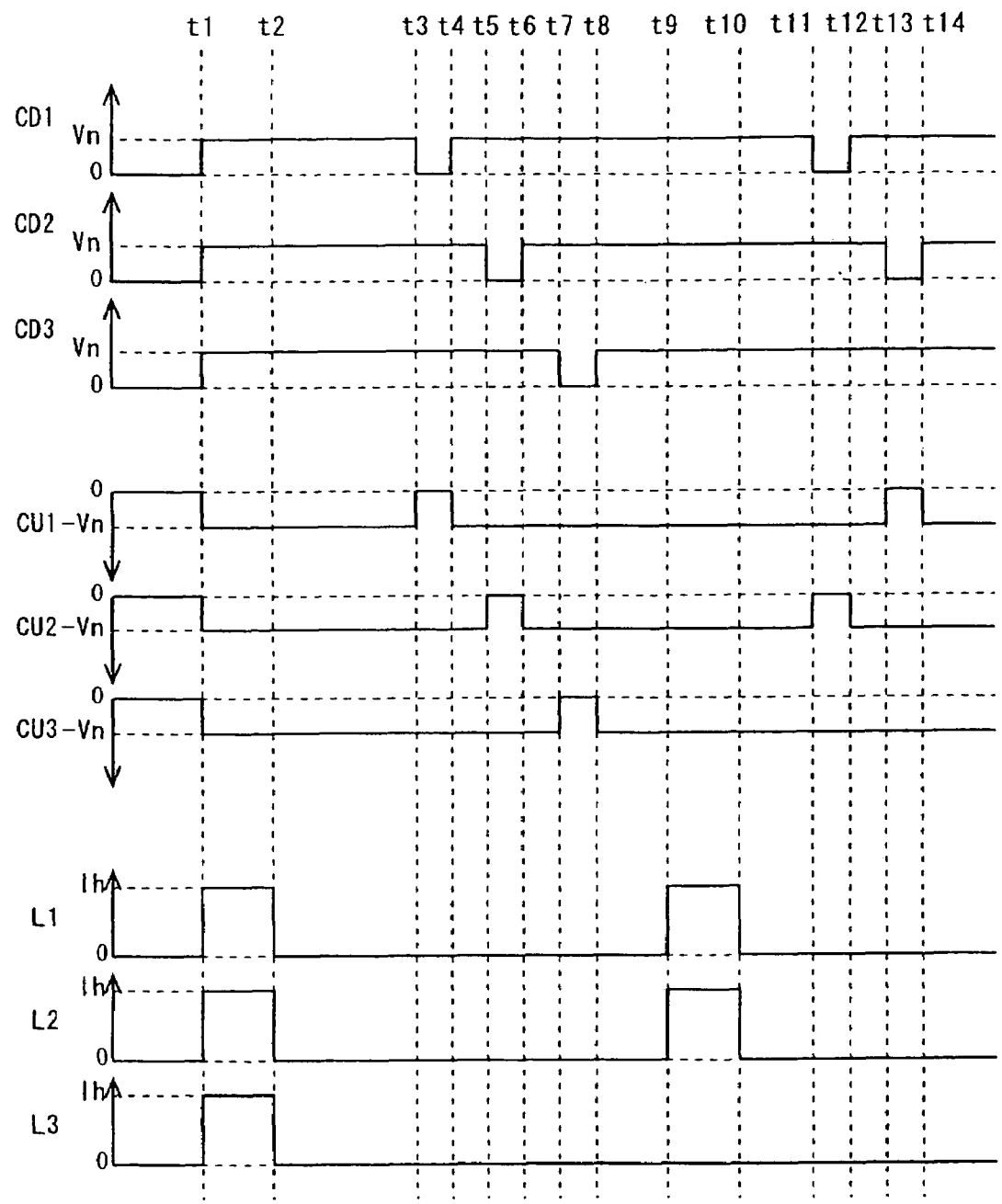
FIG. 33 is a timing chart of electrical potentials which an external control circuit applies to terminals and of currents which are passed through coils through terminals, in an optical switch system in a sixth embodiment of the present invention.

FIG. 33 is a timing chart of electrical potentials which an external control circuit 6 applies to terminals CD1 to CD3 and CU1 to CU3 and of currents which are passed through coils through terminals L1 to L3, in an optical switch system in a sixth embodiment of the present invention, and corresponds to FIG. 32.

This embodiment only differs from the fifth embodiment in that, whereas, in the fifth embodiment, as shown in FIG. 32, the external control circuit 6 applies any one of the three electrical potentials Vh', Vm, and 0 to the terminals CD1 to CD3 of the first terminal group and applies any one of the three electrical potentials −Vh', −Vm, and 0 to the terminals CU1 to CU3 of the second terminal group, in this embodiment, as shown in FIG. 33, the external control circuit 6 applies either of two electrical potentials Vn and 0 to the terminals CD1 to CD3 of a first terminal group and applies either of two electrical potentials −Vn and 0 to the terminals CU1 to CU3 of a second terminal group. Vn is a positive value.

FIG. 33 shows a timing chart for achieving the same operations as those achieved based on FIG. 32 in each period. In the embodiment, when a maximum value and a minimum value among clamp voltages Vc of all of the actuators 111 are represented by Vcmax and Vcmin, respectively, and a maximum value and a minimum value among unclamp voltages Vr are represented by Vrmax and Vrmin, respectively, they are set so that the following Relational Expressions (5) and (6) are established.

Vn>Vrmax  (5)

Vrmin>0  (6)

The embodiment provides the same advantages as those of the fifth embodiment, and, since only a smaller number of different voltages are used, the advantage that the structure of the external control circuit 6 is simplified. The sixth embodiment may be modified as the first embodiment is modified to achieve the second and fourth embodiments.

[Seventh Embodiment]

Figure 34:
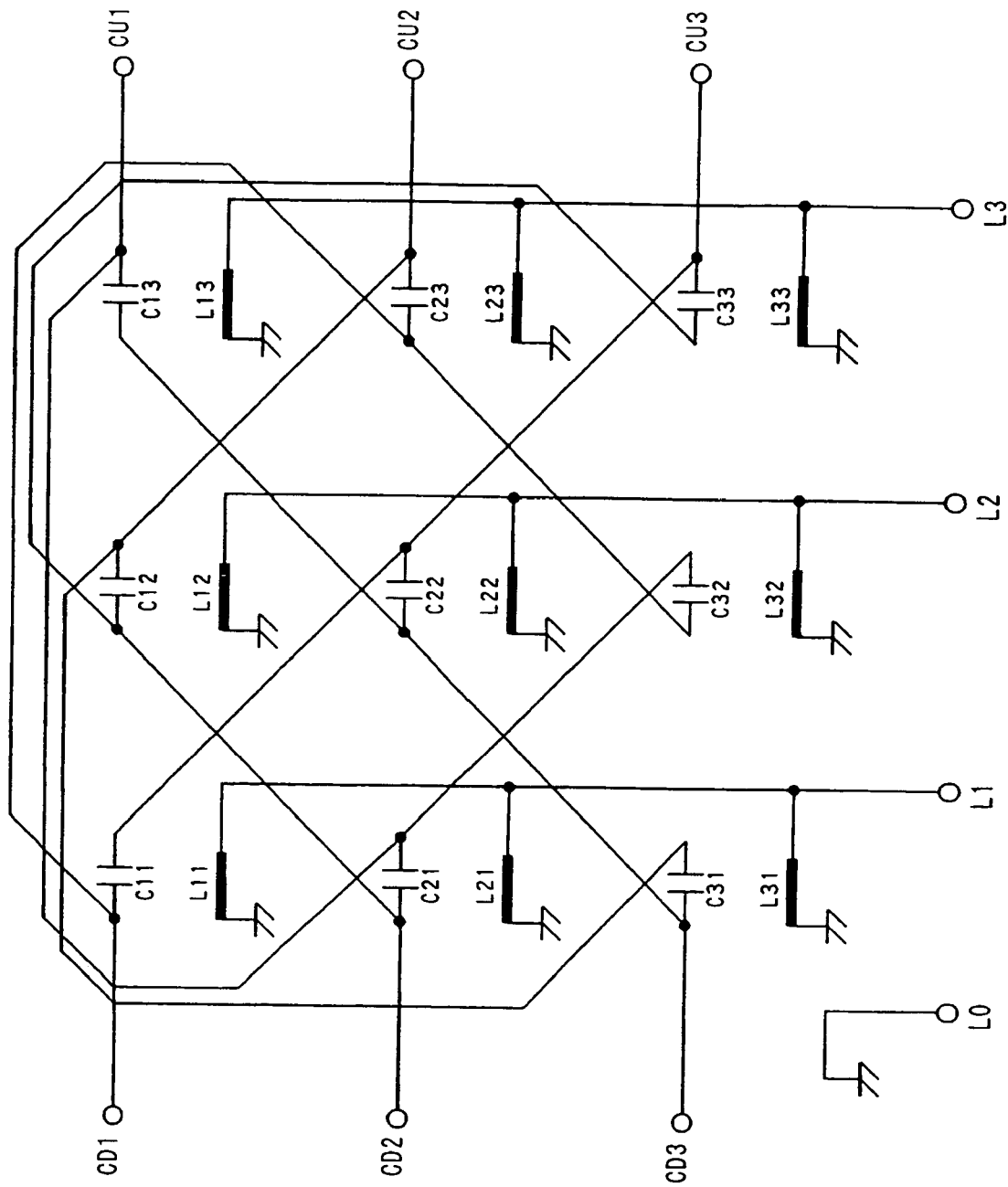
FIG. 34 is an electrical circuit diagram illustrating an optical switch array used in an optical switch system in a seventh embodiment of the present invention.
Figure 35:
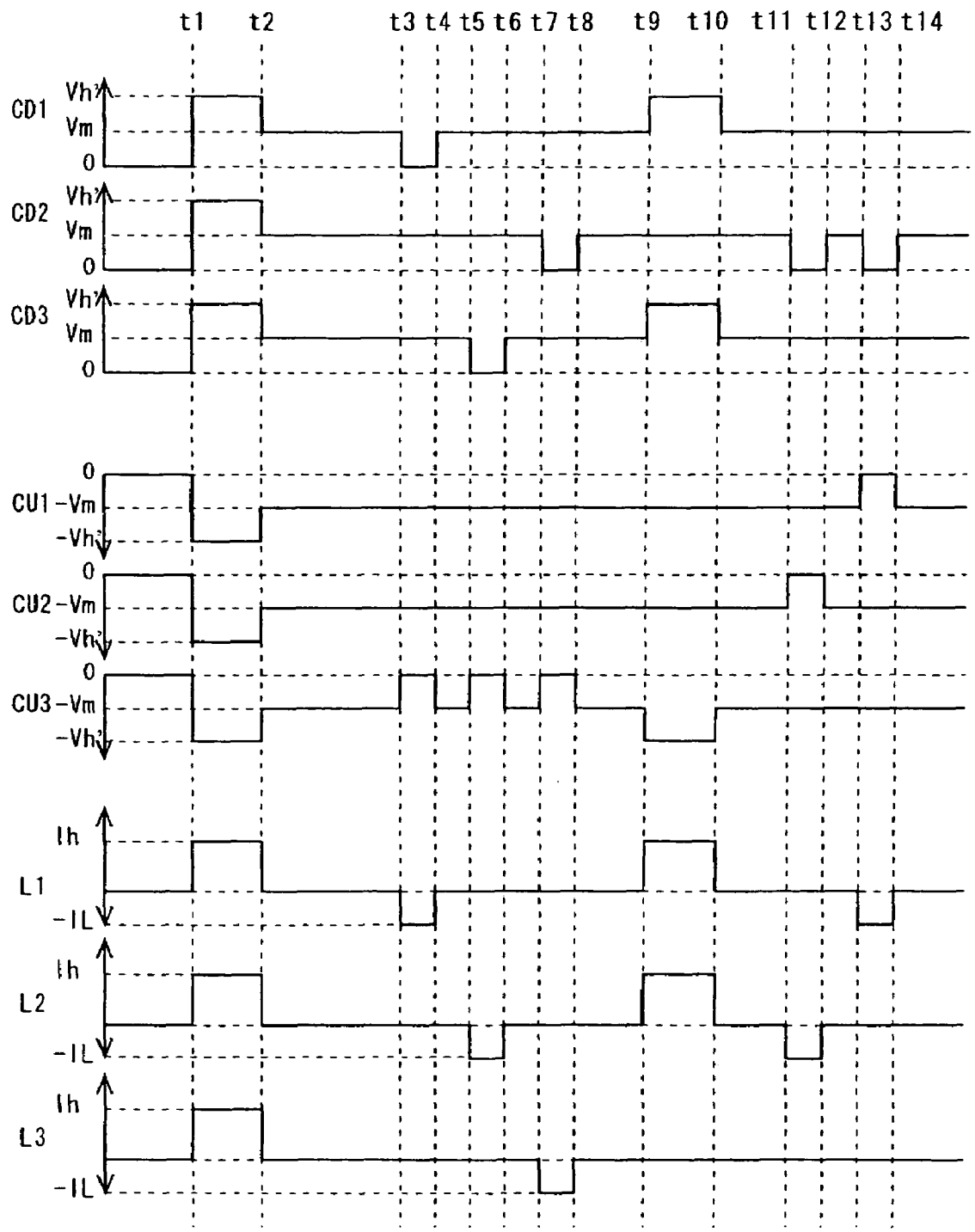
FIG. 35 is a timing chart of electrical potentials which an external control circuit applies to terminals and of currents which are passed through coils through terminals, in the optical switch system in the seventh embodiment of the present invention.

FIG. 34 is an electrical circuit diagram illustrating an optical switch array used in an optical switch system in a seventh embodiment of the present invention. FIG. 35 is a timing chart of electrical potentials which an external control circuit 6 applies to terminals CD1 to CD3 and CU1 to CU3 and of currents which are passed through coils through terminals L1 to L3, in the optical switch system in the seventh embodiment of the present invention; and corresponds to FIG. 32. FIG. 35 shows an example of a timing chart for achieving the same operations as those achieved based on FIG. 33 in each period.

This embodiment only differs from the sixth embodiment in electrical connection relationships between microactuators 111 and the terminals CD1 to CD3 and CU1 to CU3 on a substrate 121 of the optical switch array, states of application of electrical potentials to the terminals CD1 to CD3 and CU1 to CU3 by the external control circuit 6, and states of application of currents to the coils via the terminals L1 to L3 by the external control circuit 6.

In the embodiment, as shown in FIG. 34, the electrical connection relationships between capacitors and the terminals CD1 to CD3 and CU1 to CU3 are the same as those in FIG. 17. In the embodiment, due to the use of such an electrical connection, the external control circuit 6 is constructed so as to apply electrical potentials to the terminals CD1 to CD3 and CU1 to CU3 as shown in FIG. 35. In each period, the electrical potentials applied to the terminals CD1 to CD3 and CU1 to CU3 in FIG. 35 are basically the same as those in FIG. 13. However, in the embodiment, as in the sixth embodiment, the electrical potentials applied to the terminals CD1 to CD3 in a period t1 to t2 and a period t9 to t10 are Vh', which are positive values less than Vh, and the electrical potentials applied to the terminals CU1 to CU3 in the period t1 to t2 and the period t9 to t10 are −Vh'. A value equal to 2×Vh' does not necessarily have to be greater than Vcmax.

In the embodiment, as shown in FIG. 35, at a period t3 to t4, an electrical current −IL flows through the terminal L1, causing Lorentz force to act in a direction in which the distance between a movable electrode and a fixed electrode increases, thereby helping a capacitor C11 to change states from a clamped state to an unclamped state. This is effective in increasing the unclamping speed. At this time, the coils L11, L21, and L31 are connected to the terminal L1, fixed electrodes of capacitors C21 and C31 are connected to the terminals CD2 and CD3, respectively, and movable electrodes of the capacitors C21 and C31 are connected to the terminals CU1 and CU2, respectively. The voltages between the electrodes of the capacitors are maintained at values equal to 2×Vh'. Therefore, actuators 211 of the capacitors C21 and C31 are clamped firmly, so that, even if Lorentz force is exerted, they are not unclamped.

Similarly, at a period t5 to t6, an electrical current −IL flows through the terminal L2, thereby producing Lorentz force which helps the capacitor C22 to change states from a clamped state to an unclamped state; and, at a period t7 to t8, an electrical current −IL flows through the terminal L3, thereby producing Lorentz force which helps the capacitor C33 to change states from a clamped state to an unclamped state. These are effective in increasing the unclamping speeds.

The embodiment provides the same advantages as those of the sixth embodiment. The seventh embodiment may be modified as the first embodiment is modified to achieve the second and fourth embodiments.

[Eighth Embodiment]

Figure 36:
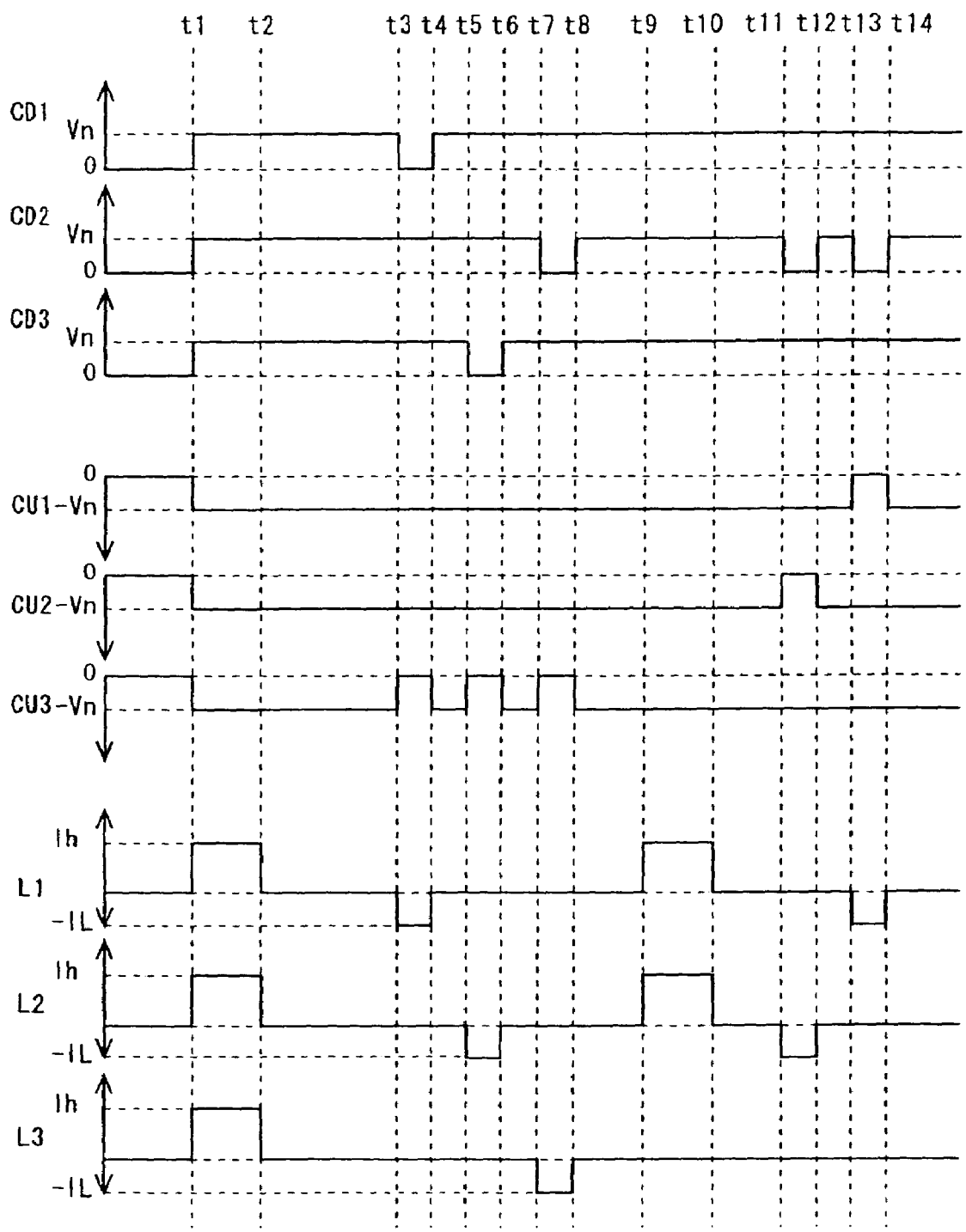
FIG. 36 is a timing chart of electrical potentials which an external control circuit 6 applies to terminals and of currents which are passed through coils through terminals, in an optical switch system in an eighth embodiment of the present invention.

FIG. 36 is a timing chart of electrical potentials which an external control circuit 6 applies to terminals CD1 to CD3 and CU1 to CU3 and of currents which are passed through coils through terminals L1 to L3, in an optical switch system in an eighth embodiment of the present invention.

This embodiment only differs from the seventh embodiment in that, whereas, in the seventh embodiment, as shown in FIG. 35, the external control circuit 6 applies any one of the three electrical potentials Vh', Vm, and 0 to the terminals CD1 to CD3 of the first terminal group and applies any one of the three electrical potentials −Vh', −Vm, and 0 to the terminals CU1 to CU3 of the second terminal group, in this embodiment, as shown in FIG. 36, the external control circuit 6 applies either of two electrical potentials Vn and 0 to the terminals CD1 to CD3 of a first terminal group and applies either of two electrical potentials −Vn and 0 to the terminals CU1 to CU3 of a second terminal group. Vn is a positive value.

FIG. 36 shows an example of a timing chart for achieving the same operations as those achieved based on FIG. 35 in each period. In the embodiment, when a maximum value and a minimum value among clamp voltages Vc of all of the actuators 111 are represented by Vcmax and Vcmin, respectively, and a maximum value and a minimum value among unclamp voltages Vr are represented by Vrmax and Vrmin, respectively, they are set so that the Relational Expressions (5) and (6) are established.

The embodiment provides the same advantages as those of the fifth embodiment, and, since only a smaller number of different voltages are used, the advantage that the structure of the external control circuit 6 is simplified. The eighth embodiment may be modified as the first embodiment is modified to achieve the second and fourth embodiments.

Although the present invention has been described with reference to the above-described embodiments, the present invention is not limited to these embodiments.

For example, although in the embodiments, the microactuator device of the present invention is applied to an optical switch system, the microactuator device of the present invention is not limited in its application to an optical switch system.

As can be understood from the foregoing description, the present invention can provide a microactuator array which can reduce the number of wires which are externally connected because an address circuit, a selecting switch, etc. are not mounted; and a microactuator device, an optical switch array, and an optical switch system, which use the microactuator array.

The above-described embodiments are examples, and various modifications can be made without departing from the spirit and scope of the invention.

What is claimed is:

1. A microactuator array comprising:
a plurality of first terminals equal in number to a first number;
a plurality of second terminals equal in number to a second number; and
a plurality of microactuators equal in number to the product of the first number and the second number, the plurality of microactuators disposed in a lattice in a two-dimensional plane,
wherein each microactuator comprises a fixed electrode and a movable electrode that is movable with respect to the fixed electrode by electrostatic force,
wherein each first terminal is electrically connected to the fixed electrodes of microactuators equal in number to the second number,
wherein each second terminal is electrically connected to the movable electrodes of microactuators equal in number to the first number,
wherein the first terminals are not connected to any of the second terminals,
wherein one end of each microactuator is fixed at the fixed electrode, and the other end of each microactuator is movable with respect to the fixed electrode and has a beam section where the movable electrode is disposed, and
wherein each beam section is two-dimensionally bent and a portion of each beam section is two-dimensionally superimposed on the beam section of an adjacent microactuator.

2. A microactuator device comprising:
the microactuator array of claim 1; and
a controller for selectively applying a voltage to the first terminals and to the second terminals.

3. A microactuator device according to claim 2, wherein, when the movable electrode of a microactuator is driven so as to be attracted to the fixed electrode, the controller applies a voltage to the second terminal connected to the movable electrode of the microactuator and to the first terminal connected to the fixed electrode of the microactuator so that a potential difference between the movable electrode and the fixed electrode of the microactuator is equal to or greater than a predetermined potential difference.

4. An optical switch system comprising:
the microactuator device of claim 2; and
mirrors disposed at the respective beam sections of the plurality of microactuators.

5. A microactuator device according to claim 2, further comprising:
a magnetic field generating section for generating a magnetic field around the microactuator array,
wherein each microactuator has an electrical current path, disposed at a movable section including the corresponding movable electrode, for generating Lorentz force in the magnetic field, and
wherein, when the movable electrode of a microactuator is driven so as to be attracted to the fixed electrode, the controller applies a predetermined voltage to the second terminal connected to the movable electrode of the microactuator and to the first terminal connected to the fixed electrode of the microactuator, and passes a predetermined electrical current through an electrical current path of the microactuator.

6. An optical switch array comprising:
the microactuator array of claim 1; and
mirrors disposed at the respective beam sections of the plurality of microactuators.

7. A microactuator device comprising a microactuator array and a controlling section,
the microactuator array comprising:
a plurality of microactuators, each microactuator comprising a movable section that is movable with respect to a fixed section, a first electrode disposed at the fixed section, and a second electrode disposed at the movable section and capable of generating electrostatic force between the first electrode and the second electrode by a voltage applied between the first electrode and the second electrode;
a first terminal group comprising a plurality of terminals; and
a second terminal group comprising a plurality of terminals,
wherein the movable section of each microactuator is movable between a first position where the electrostatic force is increased and a second position where the electrostatic force is reduced or eliminated, and so that a restoring force for restoring the movable section of each microactuator to the second position is generated, wherein the first electrode of each micro actuator is electrically connected to one terminal of either one of the first terminal group and the second terminal group, and is not electrically connected to the rest of the terminals of the first and second terminal groups, wherein the second electrode of each microactuator is electrically connected to one terminal of the other of the first terminal group and the second terminal group, and is not electrically connected to the rest of the terminals of the first and second terminal groups, wherein a combination of the one terminal of either one of the first terminal group and the second terminal group electrically connected to the first electrode of each microactuator and the one terminal of the other of the first terminal group and the second terminal group electrically connected to the second electrode of each microactuator is characteristic of each microactuator, wherein at least one terminal of the first terminal group is electrically connected to the first electrodes or the second electrodes of at least two of the plurality of microactuators, and wherein at least one terminal of the second terminal group is electrically connected to the first electrodes or the second electrodes of at least two of the plurality of microactuators;

the controlling section is connected to the terminals of the first and second terminal groups, and controls switching between the positions of the movable sections of the respective microactuators by controlling electrical potentials at the respective terminals of the first and second terminal groups, the controlling section is constructed so that each terminal of the first terminal group is settable at first, second, and third electrical potential states, and so that each terminal of the second terminal group is settable at fourth, fifth, and sixth electrical potential states, wherein the magnitudes of electrical potentials of the first to sixth electrical potential states satisfy a relationship in which: the electrical potential of the first electrical potential state>the electrical potential of the second electrical potential state>the electrical potential of the third electrical potential state≧the electrical potential of the fourth electrical potential state>the electrical potential of the fifth electrical potential state>the electrical potential of the sixth electrical potential state, or satisfy the reverse relationship in magnitude, wherein the difference between the electrical potential of the first electrical potential state and the electrical potential of the sixth electrical potential state is a voltage that moves to the first position the movable section of at least one microactuator, among the plurality of microactuators, having the movable section positioned at the second position when the electrical potential difference is applied between the first and second electrodes of said at least one microactuator, wherein the difference between the electrical potential of the third electrical potential state and the electrical potential of the fourth electrical potential state is a voltage that restores to the second position the movable section of at least one microactuator, among the plurality of microactuators, having the movable section positioned at the first position when the electrical potential difference is applied between the first and second electrodes of said at least one microactuator, wherein the difference between the electrical potential of the third electrical potential state and the electrical potential of the fifth electrical potential state and the difference between the electrical potential of the second electrical potential state and the electrical potential of the fourth electrical potential state are voltages that maintain at the first position and do not restore to the second position the movable section of at least one microactuator, among the plurality of microactuators, having the movable section positioned at the first position when the electrical potential differences are applied between the first and second electrodes of said at least one microactuator, and wherein the difference between the electrical potential of the second electrical potential state and the electrical potential of the fifth electrical potential state is a voltage that maintains at the second position and does not restore to the first position the movable section of at least one microactuator, among the plurality of microactuators, having the movable section positioned at the second position when the electrical potential difference is applied between the first and second electrodes of said at least one microactuator.

8. A microactuator device according to claim 7, wherein the first electrical potential state and the third electrical potential state are the same.

9. An optical switch system comprising:
the microactuator device of claim 7; and
mirrors disposed at the respective movable sections of the plurality of microactuators.

10. A microactuator array according to claim 7, wherein the number of the plurality of microactuators is equal to m×n, where m and n are integers equal to or greater than 2, wherein the number of terminals of the first terminal group is equal to m, wherein the number of terminals of the second terminal group is equal to n, wherein each terminal of the first terminal group is electrically connected to the first electrodes or the second electrodes of n microactuators of the plurality of microactuators, and wherein each terminal of the second terminal group is electrically connected to the first electrodes or the second electrodes of m microactuators of the plurality of microactuators.

11. A microactuator device comprising a microactuator array, a magnetic field generating section for generating a magnetic field, and a controlling section, the microactuator array comprising:
a plurality of microactuators, each microactuator comprising a movable section that is movable with respect to a fixed section, a first electrode disposed at the fixed section, and a second electrode disposed at the movable section and capable of generating electrostatic force between the first electrode and the second electrode by a voltage applied between the first electrode and the second electrode;

a first terminal group comprising a plurality of terminals; and a second terminal group comprising a plurality of terminals, wherein the movable section of each microactuator is movable between a first position where the electrostatic force is increased and a second position where the electrostatic force is reduced or eliminated, and so that a restoring force for restoring the movable section of each microactuator to the second position is generated, wherein the first electrode of each microactuator is electrically connected to one terminal of either one of the first terminal group and the second terminal group, and is not electrically connected to the rest of the terminals of the first and second terminal groups, wherein the second electrode of each microactuator is electrically connected to one terminal of the other of the first terminal group and the second terminal group, and is not electrically connected to the rest of the terminals of the first and second terminal groups, wherein a combination of the one terminal of either one of the first terminal group and the second terminal group electrically connected to the first electrode of each microactuator and the one terminal of the other of the first terminal group and the second terminal group electrically connected to the second electrode of each micro actuator is characteristic of each micro actuator, wherein at least one terminal of the first terminal group is electrically connected to the first electrodes or the second electrodes of at least two of the plurality of microactuators, wherein at least one terminal of the second terminal group is electrically connected to the first electrodes or the second electrodes of at least two of the plurality of microactuators, and wherein the movable section of each microactuator has an electrical current path for generating Lorentz force by disposing the electrical path of each microactuator in the magnetic field generated by the magnetic field generating section and passing electrical current;

the controlling section is electrically connected to each terminal of the first and second terminal groups and to the electrical current path of each microactuator, and controls switching between the positions of the movable section of each microactuator by controlling an electrical potential of each terminal of the first and second terminal group and the electrical current flowing in the electrical current path of each microactuator, the controlling section is constructed so that each terminal of the first terminal group is settable at first and second electrical potential states and so that each terminal of the second terminal group is settable at third and fourth electrical potential states, wherein the difference between an electrical potential of the second electrical potential state and an electrical potential of the fourth electrical potential state is a voltage that moves to the first position the movable section of at least one microactuator, among the plurality of microactuators, having the movable section positioned at the second position when the electrical potential difference is applied between the first and second electrodes of said at least one microactuator and when a predetermined electrical current is passed through the electrical current path of said at least one microactuator, wherein the difference between an electrical potential of the first electrical potential state and an electrical potential of a third electrical potential state is a voltage that restores to the second position the movable section of at least one microactuator, among the plurality of microactuators, having the movable section positioned at the first position when the electrical potential difference is applied between the first and second electrodes of said at least one microactuator, and wherein the difference between the electrical potential of the second electrical potential state and the electrical potential of the third electrical potential state and the difference between the electrical potential of the first electrical potential state and the electrical potential of the fourth electrical potential state are voltages that maintain at the first position and do not restore to the second position the movable section of at least one microactuator, among the plurality of microactuators, having the movable section positioned at the first position when the electrical potential differences are applied between the first and second electrodes of said at least one microactuator.

12. A microactuator device according to claim 11, wherein the first electrical potential state and the third electrical potential state are the same.

13. An optical switch system comprising:
the microactuator device of claim 11; and
mirrors disposed at the respective movable sections of the plurality of microactuators.

* * * * *